US 7,446,930 B2

United States Patent
Kitamura et al.

(10) Patent No.: US 7,446,930 B2
(45) Date of Patent: Nov. 4, 2008

(54) METHOD OF INVERTING POLARIZATION BY CONTROLLING DEFECT DENSITY OR DEGREE OF ORDER OF LATTICE POINTS

(75) Inventors: Kenji Kitamura, Tsukuba (JP); Sunao Kurimura, Tsukuba (JP); Masaru Nakamura, Tsukuba (JP); Shunji Takekawa, Tsukuba (JP); Kazuya Terabe, Tsukuba (JP); Shunichi Hishida, Tsukuba (JP); Tamaki Shimura, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 220 days.

(21) Appl. No.: 10/575,271
(22) PCT Filed: Nov. 10, 2004
(86) PCT No.: PCT/JP2004/017029
§ 371 (c)(1), (2), (4) Date: Apr. 11, 2006
(87) PCT Pub. No.: WO2005/047969
PCT Pub. Date: May 26, 2005

(65) Prior Publication Data
US 2007/0053054 A1 Mar. 8, 2007

(30) Foreign Application Priority Data
Nov. 12, 2003 (JP) ............................. 2003-382326
Nov. 12, 2003 (JP) ............................. 2003-382327

(51) Int. Cl.
*G02F 1/35* (2006.01)
*G02F 2/02* (2006.01)

(52) U.S. Cl. .................... 359/326; 385/122; 372/21; 372/22; 361/225; 204/157.15; 204/164
(58) Field of Classification Search ......... 359/326–332; 385/122; 372/21, 22; 361/225; 204/157.15, 204/164
See application file for complete search history.

(56) References Cited

U.S. PATENT DOCUMENTS

| | | | |
|---|---|---|---|
| 5,380,410 A * | 1/1995 | Sawaki et al. ............... 361/225 |
| 5,652,674 A * | 7/1997 | Mizuuchi et al. ........... 359/326 |
| 5,875,053 A * | 2/1999 | Webjorn et al. ............. 359/326 |
| 6,002,515 A * | 12/1999 | Mizuuchi et al. ........... 359/326 |
| 6,353,495 B1 * | 3/2002 | Mizuuchi et al. ........... 359/326 |
| 6,542,285 B1 | 4/2003 | Batchko et al. |

* cited by examiner

Primary Examiner—Sung Pak
Assistant Examiner—Daniel Petkovsek
(74) Attorney, Agent, or Firm—Manabu Kanesaka

(57) ABSTRACT

A problem to be solved is to provide a method of forming domain inverted regions of short period in a ferroelectric single crystal in a controllable time period of application of voltage and an optical wavelength conversion element using the same.

A solving means of it solves the problem by forming (i) a control layer having a larger defect density $D_{cont1}$ than the defect density $D_{ferro}$ of a ferroelectric single crystal ($D_{ferro} < D_{cont1}$) or forming (ii) a control layer having a lower degree of order of lattice points than the degree of order of lattice points of the ferroelectric single crystal on a face perpendicular to the direction of polarization of the ferroelectric single crystal in the ferroelectric single crystal.

18 Claims, 11 Drawing Sheets

METHOD OF INVERTING POLARIZATION BY CONTROLLING DEFECT DENSITY OR DEGREE OF ORDER OF LATTICE POINTS

TECHNICAL FIELD

The present invention relates to a method of forming a domain inverted region in a ferroelectric single crystal.

BACKGROUND ART

By utilizing a domain inversion phenomenon of ferroelectric, it is possible to form periodic domain inverted regions (a domain inverted structure) inside the ferroelectric. Such domain inverted regions are utilized for a frequency modulator and an optical wavelength conversion element. Particularly, it is desired to realize an optical wavelength conversion element capable of making short wavelength and an optical wavelength conversion element for high-power output, said optical wavelength conversion elements using a ferroelectric having an excellent non-linear optical effect.

In order to expand the range of wavelength conversion of an optical wavelength conversion element (that is, make wavelength shorter), it is necessary to shorten the period of domain inverted regions. A conventional manufacturing method performs a proton exchange on the surface of a ferroelectric between periodic electrodes in order to form domain inverted regions of short period (see patent literature 1, for example)

On the other hand, in order to be capable of bearing a high-power output, it is necessary to make domain inverted regions have a high aspect ratio (depth/width) by increasing the thickness in a direction perpendicular to the direction of light incident on a periodically poled structure. As a ferroelectric suitable for manufacturing a periodically poled structure being thick in thickness, there are known substantially stoichiometric lithium niobate (LiNbO$_3$; hereinafter referred to as SLN) and substantially stoichiometric lithium tantalate (LiTaO$_3$; hereinafter referred to as SLT) (see non-patent literature 1, for example).

FIG. 11 is a diagram showing a method of manufacturing a periodic domain inverted region according to the conventional art. A device 1100 comprises a lithium niobate single crystal 1101, a comb-shaped electrode 1102, a flat electrode 1103 and a proton exchange region 1104. The proton exchange region 1104 refers to a domain where a proton exchange step is performed around the comb-shaped electrode 1102 and on the surface of the lithium niobate single crystal 1101-using the comb-shaped electrode 1102 as a mask. The ferroelectricity of the lithium niobate single crystal 1101 is deteriorated in the proton exchange region 1104.

A voltage is applied to such a device 1100, using a DC power source 1105 and a high-voltage pulse power source 1106. A voltage is applied to the lithium niobate single crystal 1101 between the comb-shaped electrode 1102 and the flat electrode 1103 to invert the polarization. Since the ferroelectricity of the lithium niobate single crystal 1101 in the proton exchange region 1104 is deteriorated, the sectional area of the generated domain inverted region is said not to become larger than the sectional area of the comb-shaped electrode 1102. And in such a way there is performed an operation of obtaining a domain inverted region of short-period.

Patent literature 1; Japanese Patent Laid-Open Publication No. 2000-147,584

Non-patent literature 1; Kitamura and Terabe, "Science & Technology Journal" October 2002, pp. 70-73

DISCLOSURE OF THE INVENTION

Problem the Invention Attempts to Solve

However, patent literature 1 has a problem that it is possible to keep a domain inverted region of short period at the comb-shaped electrode 1102 side but domain inverted regions adjacent to each other are joined with each other at the flat electrode 1103 side. Therefore, it is difficult to form a domain inverted region thicker than that of the conventional art by means of patent literature 1.

And in case of manufacturing a domain inverted structure using an electric field applying method like patent literature 1, the time period of applying a voltage is shortened in order to make domain inverted regions short-period. For example, in case of forming domain inverted regions having the period of 1 to 3 µm, the time period of applying a pulse voltage is about 1 ms. The frequency required for the high-voltage pulse power source 1106 to generate such a pulse voltage is several KHz. A high-voltage power source capable of generating such a high frequency is very expensive, and eventually to make domain inverted regions short-period results in reaching an upper limit because of the apparatus.

According to non-patent literature 1, the coercive field of SLN is about ⅕ of the coercive field of conventional lithium niobate of congruent composition, and the coercive field of SLT is about 1/10 of the coercive field of conventional lithium tantalate of congruent composition. By using such SLN or SLT being low in coercive field, it is possible to obtain a domain inverted region thicker than that of the conventional art. However, a method of forming domain inverted regions of short period using such SLN or SLT has not been established. Particularly, in case of using them to form a domain inverted region thicker than that of the conventional art, since a high aspect ratio must be obtained, adjacent domain inverted regions may be joined to each other.

Accordingly, an object of the present invention is to provide a method of forming short-period domain inverted regions in a ferroelectric single crystal in a controllable time period of application of voltage and an optical wavelength conversion element using the same. A further other object of the present invention is to provide a method of forming domain inverted regions being short-period and thicker than those of the conventional art in a ferroelectric single crystal in a controllable time period of application of voltage and an optical wavelength conversion element using the same.

Means for Solving the Problems

As a result of earnest studies, the present inventors have found to be capable of solving the above-mentioned problems by (i) forming a control layer having a larger defect density $D_{cont1}$ than the defect density $D_{ferro}$ of a ferroelectric single crystal ($D_{ferro} < D_{cont1}$) or (ii) forming a control layer having a lower degree of order of lattice points than the degree of order of lattice points of the ferroelectric single crystal on a face perpendicular to the direction of polarization of the ferroelectric single crystal in regard to the ferroelectric single crystal.

The present invention has been performed on the basis of the above-mentioned knowledge, and its composition is as described in the following items (1) to (26).

The invention related to methods of forming a domain inverted region of items (1) to (14) performed on the basis of the knowledge of the former (i) out of these items and optical wavelength conversion elements created by applying these methods is referred to as the invention by the first means, and the invention related to methods of forming a domain inverted region of items (15) to (26) on the basis of the knowledge of the latter (ii) and optical wavelength conversion elements created by applying these methods is referred to as the invention by the second means.

(Invention by the First Means)

(1) A method of forming a domain inverted region in a ferroelectric single crystal, said method comprising;

a step of forming a control layer having a larger defect density $D_{cont1}$ than the defect density $D_{ferro}$ of said ferroelectric single crystal ($D_{ferro} < D_{cont1}$) on a first face perpendicular to the direction of polarization of said ferroelectric single crystal in said ferroelectric single crystal, a step of forming a first electrode on said control layer, a step of forming a second electrode having a smaller area than the area of said first electrode on a second face being opposite to said first face of said ferroelectric single crystal, and a step of applying an electric field between said first electrode and said second electrode, in which the spontaneous polarization possessed by a domain inverted region generated from said second electrode is terminated through said control layer at said first electrode side.

(2) A method of forming a domain inverted region in a ferroelectric single crystal according to item (1), wherein said ferroelectric single crystal is substantially stoichiometric lithium niobate or lithium tantalate.

(3) A method of forming a domain inverted region in a ferroelectric single crystal according to item (2), wherein said substantially stoichiometric lithium niobate or lithium tantalate comprises an element of 0.1 to 3.0 mol %, said element being selected from a group consisting of Mg, Zn, Sc and In.

(4) A method of forming a domain inverted region in a ferroelectric single crystal according to item (1), wherein the step of forming said control layer comprises;

a step of depositing a metal layer selected from a group consisting of Nb, Ta, Ti, Si, Mn, Y, W and Mo on said first face, and a step of annealing said metal layer.

(5) A method of forming a domain inverted region in a ferroelectric single crystal according to item (1), wherein the step of forming said control layer comprises a step of annealing said first face in an atmosphere selected from a group consisting of an inert atmosphere, an oxygen atmosphere and a vacuum atmosphere.

(6) A method of forming a domain inverted region in a ferroelectric single crystal according to item (1), said method further comprising a step of forming a further control layer including a first region and a second region on said second face, wherein the defect density of said second region is equal to the defect density $D_{ferro}$ of said ferroelectric single crystal and the defect density $D_{cont2}$ of said first region is larger than the defect density $D_{ferro}$ of said second region ($D_{ferro} < D_{cont2}$)

(7) A method of forming a domain inverted region in a ferroelectric single crystal according to item (6), wherein the step of forming said further control layer comprises;

a step of depositing a metal layer selected from a group consisting of Nb, Ta, Ti, Si, Mn, Y, W and Mo on said second face, and a step of annealing said metal layer.

(8) A method of forming a domain inverted region in a ferroelectric single crystal according to item (6), wherein the step of forming said further control layer comprises a step of annealing said second face through a mask in an atmosphere selected from a group consisting of an inert atmosphere, an oxygen atmosphere and a vacuum atmosphere.

(9) A method of forming a domain inverted region in a ferroelectric single crystal according to item (1), wherein said first electrode is a flat electrode and said second electrode is a periodic electrode.

(10) A method of forming a domain inverted region in a ferroelectric single crystal according to item (1), said method further comprising a step of removing said first electrode, said second electrode and said control layer.

(11) An optical wavelength conversion element manufactured by a method of forming a domain inverted region in a ferroelectric single crystal, said method of forming a domain inverted region comprising;

a step of forming a control layer having a larger defect density $D_{cont1}$ than the defect density $D_{ferro}$ of said ferroelectric single crystal ($D_{ferro} < D_{cont1}$) on a first face perpendicular to the direction of polarization of said ferroelectric single crystal in said ferroelectric single crystal, a step of forming a flat electrode on said control layer, a step of forming a periodic electrode on a second face being opposite to said first face of said ferroelectric single crystal, and a step of applying an electric field between said flat electrode and said periodic electrode, in which the spontaneous polarization possessed by a domain inverted region generated from said periodic electrode is terminated through said control layer at said flat electrode side.

(12) An optical wavelength conversion element according to item (11), wherein said ferroelectric single crystal is substantially stoichiometric lithium niobate or lithium tantalate.

(13) An optical wavelength conversion element according to item (12), wherein said substantially stoichiometric lithium niobate or lithium tantalate comprises an element of 0.1 to 3.0 mol %, said element being selected from a group consisting of Mg, Zn, Sc and In.

(14) An optical wavelength conversion element according to item (11), wherein said method further comprises a step of removing said control layer, said flat electrode and said periodic electrode.

(Invention by the Second Means)

(15) A method of forming a domain inverted region in a ferroelectric single crystal, said method comprising;

a step of forming a control layer having a lower degree of order of lattice points than the degree of order of lattice points of said ferroelectric single crystal on a first face perpendicular to the direction of polarization of said ferroelectric single crystal in said ferroelectric single crystal, a step of forming a first electrode on said control layer, a step of forming a second electrode having a smaller area than the area of said first electrode on a second face being opposite to said first face of said ferroelectric single crystal, and a step of applying an electric field between said first electrode and said second electrode, in which the spontaneous polarization possessed by a domain inverted region generated from said second electrode side is terminated through said control layer at said first electrode side.

(16) A method of forming a domain inverted region in a ferroelectric single crystal according to item (15), wherein said ferroelectric single crystal is substantially stoichiometric lithium niobate or lithium tantalate.

(17) A method of forming a domain inverted region in a ferroelectric single crystal according to item (16), wherein said substantially stoichiometric lithium niobate or lithium tantalate comprises an element of 0.1 to 3.0 mol %, said element being selected from a group consisting of Mg, Zn, Sc and In.

(18) A method of forming a domain inverted region in a ferroelectric single crystal according to item (15), wherein the step of forming said control layer comprises a step of implanting ions selected from a group consisting of rare gases, Zn, Nb and Mn into said first face.

(19) A method of forming a domain inverted region in a ferroelectric single crystal according to item (15), said method further comprising a step of forming a further control layer including a first region and a second region on said second face, wherein the degree of order of lattice points of said second region is equal to the degree of order of lattice points of said ferroelectric single crystal and the degree of order of lattice points of said first region is lower in comparison with the degree of order, of lattice points of said second region.

(20) A method of forming a domain inverted region in a ferroelectric single crystal according to item (19), wherein the step of forming said further control layer comprises a step of implanting ions selected from a group consisting of rare gases, Zn, Nb and Mn into said second face through a mask.

(21) A method of forming a domain inverted region in a ferroelectric single crystal according to item (15), wherein said first electrode is a flat electrode and said second electrode is a periodic electrode.

(22) A method of forming a domain inverted region in a ferroelectric single crystal according to item (15), said method further comprising a step of removing said first electrode, said second electrode and said control layer.

(23) An optical wavelength conversion element manufactured by a method of forming a domain inverted region in a ferroelectric single crystal, said method comprising;

a step of forming a control layer having a lower degree of order of lattice points than the degree of order of lattice points of said ferroelectric single crystal on a first face perpendicular to the direction of polarization of said ferroelectric single crystal in said ferroelectric single crystal, a step of forming a flat electrode on said control layer, a step of forming a periodic electrode on a second face being opposite to said first face of said ferroelectric single crystal, and a step of applying an electric field between said-flat electrode and said periodic electrode, in which the spontaneous polarization possessed by a domain inverted region generated from said periodic electrode side is terminated through said control layer at said flat electrode side.

(24) An optical wavelength conversion element according to item (23), wherein said ferroelectric single crystal is substantially stoichiometric lithium niobate or lithium tantalate.

(25) An optical wavelength conversion element according to item (24), wherein said substantially stoichiometric lithium niobate or lithium tantalate comprises an element of 0.1 to 3.0 mol %, said element being selected from a group consisting of Mg, Zn, Sc and In.

(26) An optical wavelength conversion element according to item (23), wherein said method further comprises a step of removing said control layer, said flat electrode and said periodic electrode.

EFFECT OF THE INVENTION

A solution means of the present invention comprises;

(1) A step of forming a control layer on a first face of a ferroelectric single crystal, a step of forming a first electrode on the control layer, a step of forming a second electrode on a second face being opposite to the first face of the ferroelectric single crystal, and a step of applying an electric field in the direction from the second electrode to the first electrode. Here, the defect density $D_{cont1}$ of the control layer and the defect density $D_{ferro}$ of the ferroelectric single crystal satisfy the relation of "$D_{ferro} < D_{cont1}$"; or (2) A step of forming a control layer on a first face being a face perpendicular to the direction of polarization of a ferroelectric single crystal, a step of forming a first electrode on the control layer, a step of forming a second electrode having a smaller area than the area of the first electrode on a second face being opposite to the first face of the ferroelectric single crystal, and a step of applying an electric field between the first electrode and the second electrode. Here, the control layer and the ferroelectric single crystal satisfy that the degree of order of lattice points of the control layer is lower than the degree of order of lattice points of the ferroelectric single crystal. And the control layer is disposed at the side where the spontaneous polarization possessed by a domain inverted region generated from the second electrode side is terminated.

According to the above-mentioned composition (1) or (2), the growth speed of a minute domain inverted region (that is, domain) growing in the direction from the second electrode to the first electrode is made low or zero at the control layer. As a result, the termination of spontaneous polarization of domain is suppressed, and the growth of domain in a direction perpendicular to the direction of application of electric field is suppressed.

Even in case of forming domain inverted regions of short period, it is necessary to apply an electric field to a ferroelectric single crystal for a longer time than that in the conventional art. Therefore, it is possible to make domain inverted regions more short-period using a conventional apparatus without using an expensive apparatus. And since the growth of domain is controlled at the first electrode side, the periodicity of domain inverted regions of the first electrode side is not disordered. Since the present method can be applied regardless of the thickness of a ferroelectric single crystal, it is possible to manufacture a thick optical wavelength conversion element for high-power output. Specific actions and effects described above are obtained.

DESCRIPTION OF THE SYMBOLS

Figure 1:
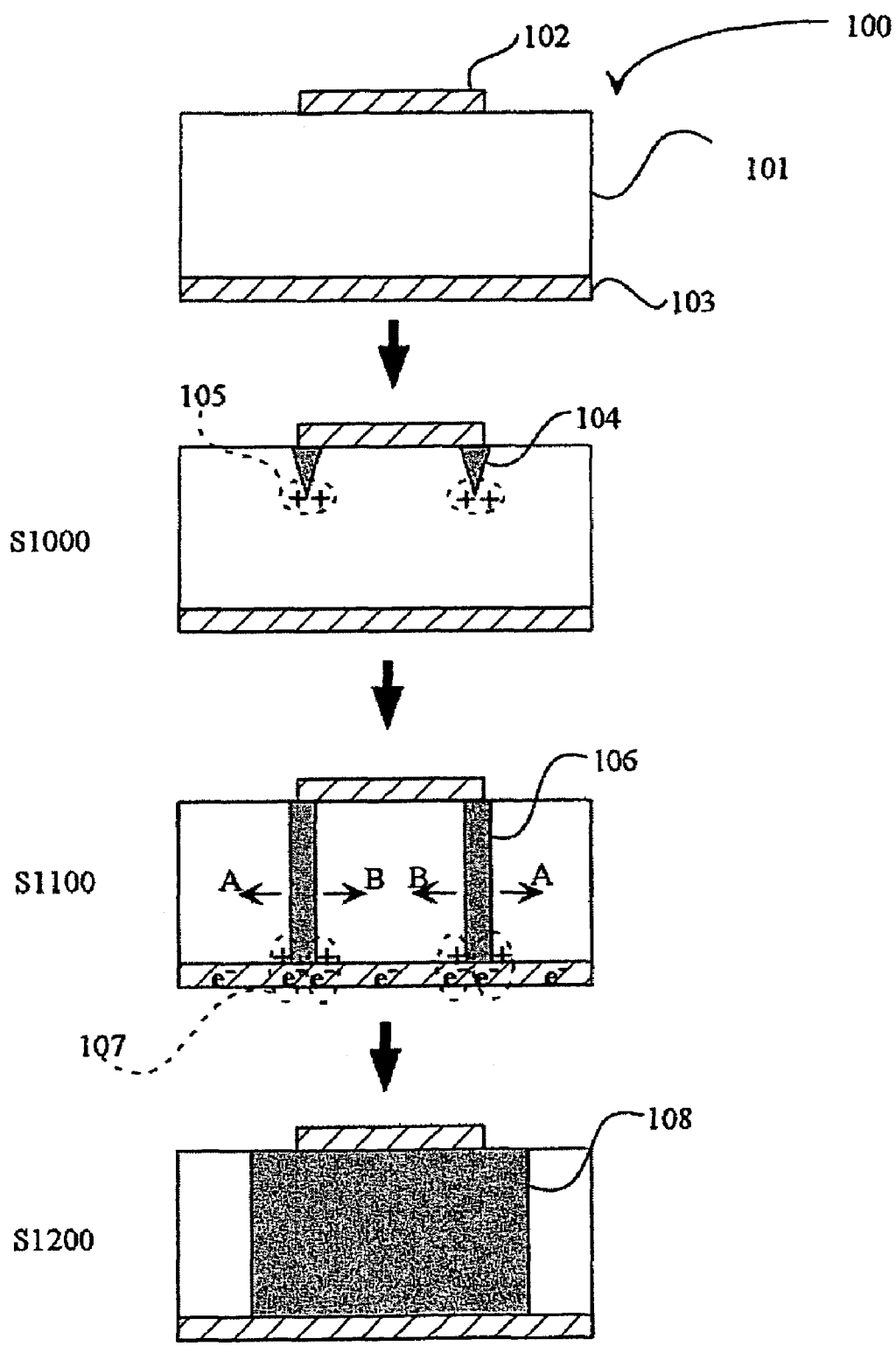
FIG. 1 is a diagram showing steps of forming a domain inverted region in ferroelectric single crystal.

200 Device
201, 300 Ferroelectric single crystal
202, 302, 400, 801 Control layer
203, 303, 802 First electrode
204, 304, 505, 803, 904 Second electrode
305, 804 Electric field generator
502, 600, 901 Further control layer
503, 601, 902 First region
504, 602, 903 Second region
700, 1000 Optical wavelength conversion element
701, 1001 Light source
702, 1002 Beam-condensing optical system
703, 1003 Domain inverted region

BEST MODE FOR CARRYING OUT THE INVENTION

A step of forming a domain inverted region in a ferroelectric single crystal is described prior to description of a principle of the present invention.

FIG. 1 is a diagram showing steps of forming a domain inverted region in a ferroelectric single crystal. A device 100 comprises a ferroelectric single crystal 101, an upper electrode 102 and a lower electrode 103. The ferroelectric single crystal 101 may be an optional ferroelectric single crystal having a 180-degree domain. The upper electrode 102 may be a periodic electrode such as a comb-shaped electrode or the like. The lower electrode 103 may be a flat electrode. The upper electrode 102 and the lower electrode 103 may be in any shape so long as the upper electrode 102 is smaller in area than the lower electrode 103.

Next, each step is described.

Step S1000: This shows the state just after an electric field has been applied to the device 100. A minute domain 104 in which a ferroelectric single crystal 101 is polarization-inverted is generated at an end of the upper electrode 102. The reason why the domain is generated at an end of the upper electrode 102 is that an electric field is most concentrated there. Electrostatic charges generated by spontaneous polarization of this domain 104 are designated by "plus".

Step S1100: The domain 104 reaches the lower electrode 103 to become a domain 106. The electrostatic energy in a region 105 where spontaneous polarizations face each other is high and unstable. In order that the region 105 becomes stable in energy, therefore, the domain 104 does not grow in a direction perpendicular to the direction of application of electric field (that is, does not grow in the direction of electrode area) but grows in the direction of application of electric field. The reason is that when the domain 104 spreads in the direction of electrode area, the electrostatic energy is increased and becomes more unstable.

When the domain 104 reaches the lower electrode 103 to become the domain 106, the electrostatic energy (electrostatic charges) of the domain 106 is compensated by free electrons (compensation charges) freely moving in the lower electrode 103 (107). This is called termination of spontaneous polarization. When the spontaneous polarization of the domain 106 is terminated, the domain 106 spreads in the direction of electrode area (arrow A and arrow B). The reason is that the crystal structure of the boundary portion between the domain 106 and the ferroelectric single crystal 101 is unstable in energy. Under the state where an electric field is applied, in order to solve the unstableness in energy, there occurs a phenomenon that the domain inversion spreads in the direction of electrode area (called a side wind).

Step S1200: Step S1000 and step S1100 are repeated, the ferroelectric single crystal 101 between the upper electrode 102 and the lower electrode 103 is polarization-inverted and thereby a domain inverted region 108 is generated. In detail, domains 104 in step S1000 are generated one after another directly under the upper electrode 102 according to the magnitude of concentration of an electric field to grow toward the lower electrode 103. Next, the domain is terminated and a side wind occurs and thereby the domain inverted region 108 is generated. However, the side wind occurs also in an area where an electric field is not applied (the direction of arrow A in FIG. 1), as described above. The speed of the side wind is higher in the direction of arrow B than in the direction of arrow A. As a result, the domain inverted region 108 more spreading than the upper electrode 102 is generated. In case that the upper electrode 102 is a periodic electrode such as a comb-shaped electrode or the like and the period is very short, adjacent domain inverted regions may be joined to each other.

The present inventors have paid attention to control of the occurrence of side wind in order to obtain domain inverted regions of short period. In more detail, the present inventors have paid attention to control of the compensation of electrostatic charges (compensation charges) of a domain contributing to the occurrence of side wind and have found a method of controlling it.

Next, a principle of the present invention is described.

Figure 2:
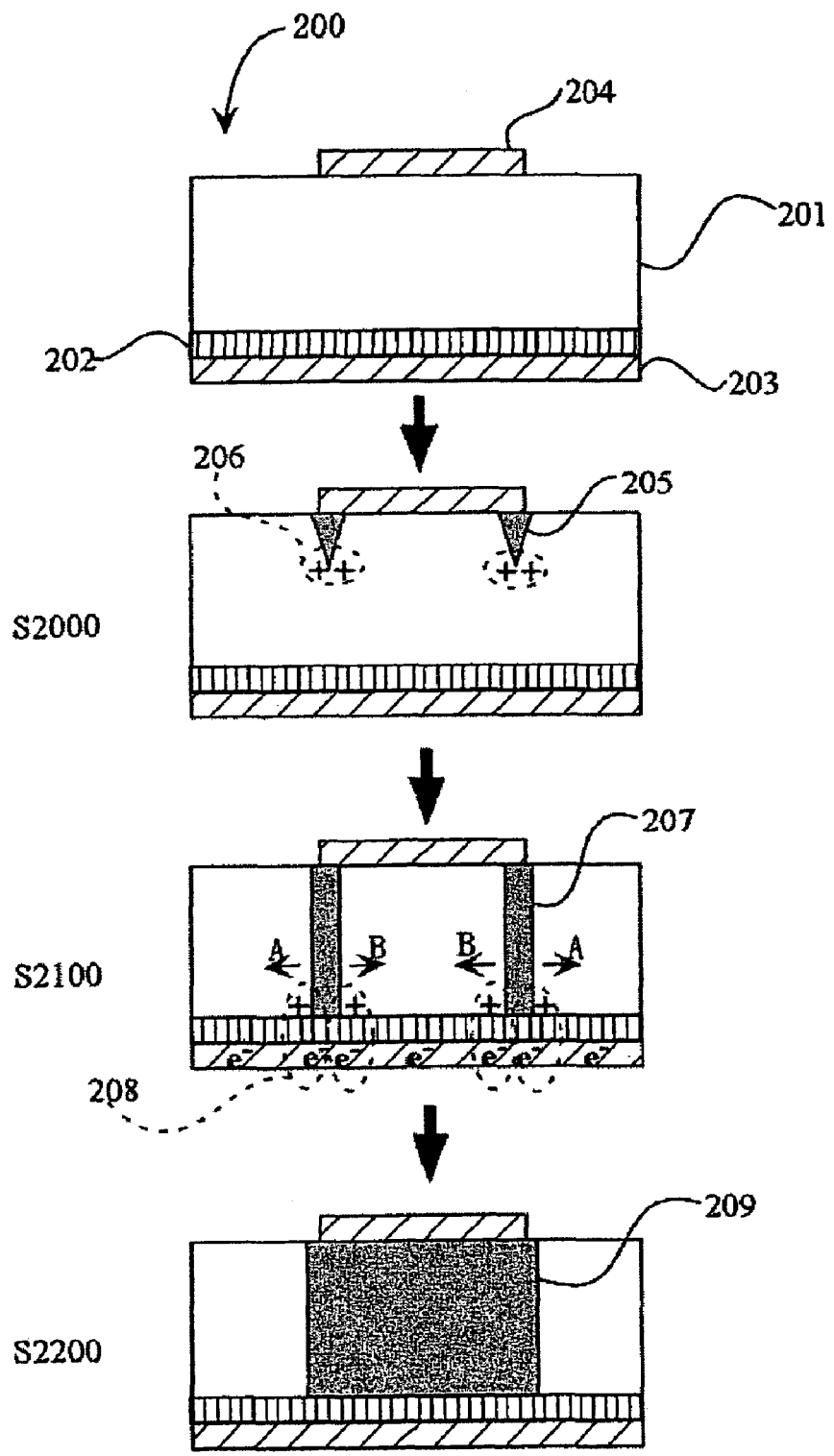
FIG. 2 is a diagram showing a method of controlling domain inversion by means of the first means or the second means of the present invention.

FIG. 2 is a diagram showing a method of controlling domain inversion by means of the first means or the second means of the present invention.

A device 200 comprises a ferroelectric single crystal 201, a control layer 202, a first electrode 203 and a second electrode 204. The ferroelectric single crystal 201 may be an optional ferroelectric single crystal having a 180-degree domain.

The control layer 202 is formed on a face (first face) perpendicular to the direction of polarization of a 180-degree domain of the ferroelectric single crystal 201. The relation between the control layer 202 and the ferroelectric single crystal 201 is made to satisfy that the defect density $D_{cont1}$ of the control layer 202 is larger than the defect density $D_{ferro}$ of the ferroelectric single crystal 201, that is, "$D_{ferro} < D_{cont1}$" or satisfy that the degree of order of lattice points of the control layer 202 is lower than the degree of order of lattice points of the ferroelectric single crystal 201.

The control layer 202 may be, for example, an impurity-diffused layer (metal-diffused layer) made by diffusing an impurity element into a ferroelectric single crystal 201, an out-diffused layer made by out-diffusing Li in the ferroelectric single crystal 201, or an ion-implanted layer made by implanting ions into the ferroelectric single crystal 201.

Said metal-diffused layer and said out-diffused layer have respectively substitutional impurities which do not generate geometrical disorder in a crystal lattice of the parent material and vacancies which generate geometrical disorder in a crystal lattice of the parent material. Therefore, there are a larger number of such defects (substitutional impurities or vacancies) in the control layer 202 in comparison with the ferroelectric single crystal 201. Note that these defects generated in the control layer 202 by metal diffusion or out-diffusion do not damage the equilibrated state of a crystal lattice of the parent material. In other words, the quantity of defects generated in the control layer 202 by metal diffusion or out-diffusion is finite and the maximum quantity of defects is limited to the degree capable of keeping the equilibrated state of a crystal lattice of the parent material. This maximum quantity of defects depends on a material for the parent material.

And said ion-implanted-layer can include the range from a state having vacancies, self-interstitial atoms and interstitial impurities generating a geometric disorder in a crystal lattice of the parent material to a completely amorphous state. Note that the ion-implanted layer may damage the equilibrated state of a crystal lattice of the parent material. Since it is possible to make a crystal lattice of the control layer 202 non-equilibrated by using ion implantation, it is possible to optionally set the degree of order of lattice points of the control layer 202 in comparison with the degree of order of lattice points of the ferroelectric single crystal 201.

The first electrode 203 is a flat electrode formed on the control layer 202. The second electrode 204 is a periodic electrode such as a comb-shaped electrode or the like formed on a second face being opposite to a first face. The first electrode 203 and the second electrode 204 may be in any shape so long as the second electrode 204 is smaller in area than the first electrode 203.

Next, each step is described.

Step S2000: This shows a state of forming a domain just after an electric field has been applied to the device 200. A minute domain 205 (domain inverted region) is generated at an end of the second electrode 204 by a fact that a ferroelectric single crystal 201 is polarization-inverted. Electrostatic charges generated by spontaneous polarization of this domain 205 is designated by "plus".

Step S2100: The domain 205 reaches the control layer 202 to become a domain 207. The electrostatic energy in a region 206 where spontaneous polarizations face each other is high and unstable, as described in step S1100 with reference to FIG. 1. In order that the region 206 becomes stable in energy, therefore, the domain 205 grows in the direction of application of electric field (the direction from the second electrode 204 to the first electrode 203).

The speed of the domain 207 growing toward the first electrode 203 is made low or zero after the domain 207 has reached the control layer 202. The reason is that the control layer 202 functions so as to suppress the growth of domain (that is, reduce the growth speed of domain) or stop the growth of domain (that is, make the growth speed zero) due to a fact that the control layer 202 has a higher defect density than the defect density of the ferroelectric single crystal 201, or has a lower degree of order of lattice points than the degree of order of lattice points of the ferroelectric single crystal 201.

In case that the control layer 202 and the ferroelectric single crystal 201 satisfy the above-mentioned relation, the growth of domain is physically hindered by a geometrical disorder of a crystal lattice due to the existence of vacancies or by the existence of atoms of a different kind. Or the growth of domain is physically hindered by a geometrical disorder of a crystal lattice due to a low degree of order of lattice points. This means that the growth of domain (growth speed) is suppressed or stopped at the control layer 202. It is known that the magnitude of defect density or the degree of order of lattice points has an influence on the growth speed of domain.

In such a way, since the domain 207 reaching the first electrode 203 is reduced by the control layer 202 or arrival of the domain 207 at the first electrode 203 is suppressed, it is difficult for free electrons of the first electrode 203 (compensation charges) to compensate the electrostatic charges generated by spontaneous polarization of the domain 207 (208). This means that the spontaneous polarization of domain 207 is difficult to be terminated, the growth of domain 207 (side wind) in a direction perpendicular to the direction of application of an electric field (that is, in the direction of electrode area) is suppressed.

In more detail, since the control layer 202 is not a complete insulator, free electrons (compensation charges) from the first electrode 203 can move in the control layer 202 taking a sufficient time and can compensate the electrostatic charges generated by spontaneous polarization of the domain 207 (that is, the spontaneous polarization possessed by a domain inverted region grown from the second electrode 204 side is terminated at the first electrode 203 side through the control layer 202). For example, in case that the ferroelectric single crystal 201 is substantially stoichiometric lithium niobate (SLN), it takes a time of at least 1 second for free electrons to move in the control layer 202 and reach the domain 207.

In other words, according to the present invention, it is possible to control the time required for compensation of the electrostatic charges of the domain 207 by only disposing the control layer 202 at the side of an electrode compensating the spontaneous polarization of the domain 207 (that is, at the first electrode 203 side) and controlling in magnitude the ratio of the defect density $D_{ferro}$ of the ferroelectric single crystal 201 to the defect density $D_{cont1}$ of the control layer 202 or the ratio of the degree of order of lattice points of the ferroelectric single crystal 201 to the degree of order of lattice points of the control layer 202. The occurrence of side wind of the domain 207 can be also controlled. For example, even in case of forming domain inverted regions of 1 to 3 μm in period using SLN, since the time period of applying a pulse voltage needs to be at least about 10 ms, a conventional general-purpose pulse power source can be used. This time period of applying a pulse voltage is within a controllable time range and is also a sufficient time for stabilizing domain inverted regions of the ferroelectric single crystal 201.

Step S2200: Step S2000 and step S2100 are repeated, the ferroelectric single crystal 201 between the first electrode 203 and the second electrode 204 is polarization-inverted and a domain inverted region 209 is generated, and thereafter the application of voltage is stopped. This time period is within a controllable time period of application of voltage as described in step S2100. A side wind occurs in the direction of arrow A and the direction of arrow B as described with reference to FIG. 1.

However, the speed of a side wind generated in the direction of arrow A is remarkably slower than the speed of a side wind generated in the direction of arrow B. This is due to the distribution of electric field. Therefore, the sectional area of a domain inverted region 209 generated can be larger than the area of the second electrode 204, but an influence which this has on the device is so small as not to come into question at all.

As described above, according to the present invention, it is possible to form domain inverted regions of shorter period than those of the conventional art within a controllable time period of application of voltage by providing a control layer 202 between a ferroelectric single crystal 201 and a first electrode 203 (that is, providing a control layer 202 at the termination side of the spontaneous polarization of the domains).

It is possible to vary the time period of application of voltage by varying the relation between the defect density $D_{ferro}$ of the ferroelectric single crystal 201 and the defect density $D_{cont1}$ of the control layer 202 or the relation between the degree of order of lattice points of the ferroelectric single crystal 201 and the degree of order of lattice points of the control layer 202.

That is to say, the time of application of voltage required for forming a domain inverted region is made longer by increasing the quantity of metal diffusion and out-diffusion or by implanting a larger amount of ions. The time of application of voltage required for forming a domain inverted region is made shorter by reducing the quantity of metal diffusion and out-diffusion or implanting a smaller amount of ions.

Such settings can be properly designed according to the period of domain inverted regions, a material for a ferroelectric single crystal and the like. However, it is a matter of course to be capable of obtaining the effects of the present invention so long as a ferroelectric single crystal 201 and a control layer 202 satisfy the above-mentioned relation.

A method of the present invention can be applied to an optional ferroelectric in which a ferroelectric single crystal 201 has a 180-degree domain, and in case of using SLN or SLT as a ferroelectric single crystal 201, it is possible to form domain inverted regions-being short-period and thicker in comparison with those of the conventional art.

Embodiments of the present invention are described in detail with reference to the drawings in the following. In the figures, like elements are given like reference symbols and description of them is omitted. In the embodiments, the case that substantially stoichiometric lithium niobate (SLN) is used as a ferroelectric single crystal is described, but the ferroelectric single crystal is not limited to this. For example, SLN may be used which is doped with an element of 0.1 to 3.0 mol %, said element being selected from a group consisting of Mg, Zn, In and Sc.

SLN is made by the Czochralski method using a double crucible disclosed in Japanese Patent Laid-Open Publication No. 2000-344,595, for example. Like effects are obtained also by adopting substantially stoichiometric lithium tantalate (SLT) or SLT doped with an element of 0.1 to 3.0 mol %, said element being selected from a group consisting of Mg, Zn, In and Sc instead of adopting SLN. In this case also, SLT is made by the Czochralski method using a double crucible disclosed in Japanese Patent Laid-Open Publication No. 2000-344,595, for example.

Substantially "SLN is of stoichiometric composition" means the mol ratio of $Li_2O/(Nb_2O_5+Li_2O)$ is not completely 0.50 but has a composition closer to the stoichiometric ratio than a congruent composition (has the mol ratio of $Li_2O/(Nb_2O_5+Li_2O)$=0.495 to 0.5) and the degradation of device characteristics caused by this fact does not come into question in ordinary device design.

Similarly, substantially "SLT is of stoichiometric composition" means the mol ratio of $Li_2O/(Ta_2O_5+Li_2O)$ is not completely 0.50 but has a composition closer to the stoichiometric ratio than a congruent composition (has the mol ratio of $Li_2O/(Ta_2O_5+Li_2O)$=0.495 to 0.5) and the degradation of device characteristics caused by this fact does not come into question in ordinary device design.

Embodiments of the invention by the first means of the present invention are shown.

Embodiment 1

(1) Metal Diffusion

Figure 3:
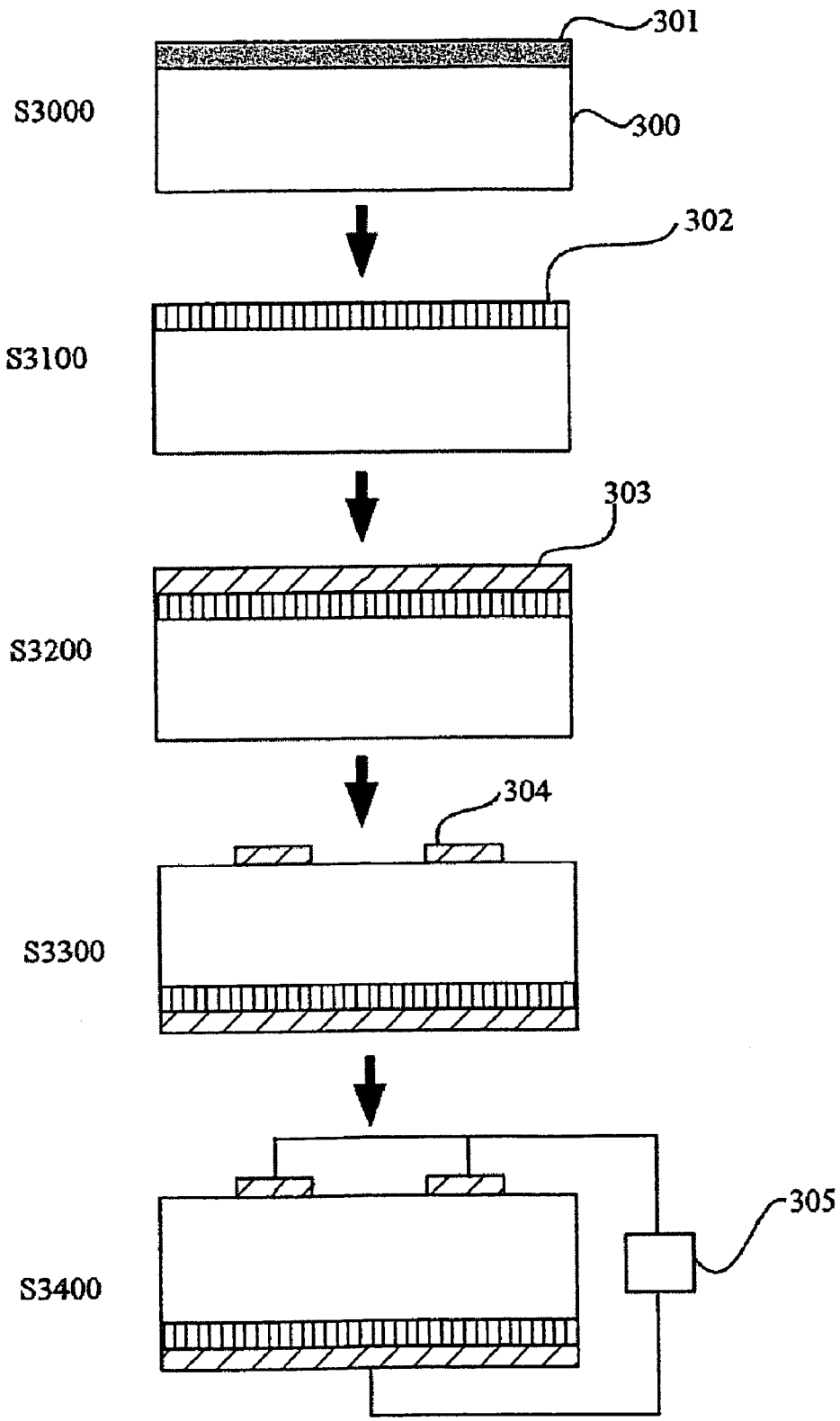
FIG. 3 is a diagram showing steps of controlling domain inversion according to embodiment 1 by means of the first means of the present invention.

FIG. 3 is a diagram showing steps of forming a domain inverted region according to embodiment 1 of the present invention. Each step is described.

Step S3000: This step forms a metal layer 301 on a first face of SLN 300. The direction of polarization of SLN 300 is parallel with the z-axis and it has a 180-degree single domain.

The thickness of SLN 300 is 3 mm, but is not limited to this thickness. Here, the first face is a face perpendicular to the direction of polarization of SLN 300, for example, the plus Z face.

The metal layer 301 may be made by a conventional physical vapor deposition or chemical vapor deposition method.

A material for the metal layer 301 can use any metal so long as it substitutes for a Li site of SLN 300 and is different in valence from Li.

A material for the metal layer 301 is preferably selected from a group consisting of Nb, Ta, Ti, Si, Mn, Y, W and Mo. The thickness of the metal layer 301 is within a range of about 100 to 1000 nm.

Step S3100: This step anneals SLN 300 having the metal layer 301 to form a control layer 302. The annealing is performed within a temperature range of about 300 to 1000° C. for about 2 to 40 hours in an atmosphere selected from a group consisting of a reducing atmosphere, an oxygen atmosphere and a vacuum atmosphere.

A metal atom in the metal layer 301 is substituted for a Li atom in SLN 300 by this annealing. The distance of diffusion of a metal atom is about 500 to 2000 nm. A diffused metal atom generates a defect (substitutional impurity in this case) in the surface layer of SLN 300.

This surface layer of SLN 300 is a control layer 302. After annealing, an excessive metal layer 301 may be removed by etching.

The evaluation of defect density of the control layer 302 may be performed by the Rutherford backscattering spectrometry (RBS) for example. By this it is possible to quantitatively measure the defect density of the control layer 302 and the defect density of SLN 300. In case of performing a metal diffusion under the above-mentioned condition, it has been confirmed that the defect density $D_{cont1}$ of the control layer 302 and the defect density $D_{ferro}$ of SLN 300 satisfy the relation of "$D_{ferro} < D_{cont1}$".

Step S3200: This step forms a first electrode 303 on the control layer 302. The first electrode 303 may be a flat electrode. The first electrode 303 may be a metal layer formed by a physical vapor deposition method or a chemical vapor deposition method. In this case a material for the first electrode 303 is Ta for example but is not limited to this material. The thickness of the first electrode 303 is about 50 to 500 nm. The first electrode 303 may be a liquid electrode of a LiCl solution (not illustrated).

Step S3300: This step forms a second electrode 304 on a second face being opposite to the first face of SLN 300. The second electrode 304 may be a periodic electrode such as a comb-shaped electrode or the like. The period of the second electrode 304 is about 1 to 3 μm. The second electrode 304 may be a metal layer formed by a physical vapor deposition method or a chemical vapor deposition method. In this case, a material for the second,electrode 304 is Cr for example but is not limited to this material. The thickness of the second electrode 304 is about 50 to 500 nm. The second electrode 304 may be a liquid electrode of a LiCl solution (not illustrated).

Dry etching may be used for making the second electrode 304. In case that the second electrode 304 is a metal layer, Cr is applied to the second face of SLN 300 using a physical vapor deposition method or a chemical vapor deposition method.

Next, photoresist is applied as a mask. The photoresist is patterned into a specified shape, for example, a periodic pattern by a photolithography technology. The shape into which the photoresist is patterned is optional and is not limited to a periodic pattern. Next, the second face of SLN 300 is etched by means of a reactive ion etching (RIE) technique. After this, the photoresist is removed.

By this, a metal layer having a periodic pattern is obtained as the second electrode 304. In case that the second electrode 304 is a liquid electrode (not illustrated), the photoresist is patterned into a specified shape without forming a metal layer. After this, the liquid electrode is applied to the patterned photoresist and SLN 300 as the second electrode 304.

Step S3400: This step applies an electric field in the direction from the second electrode 304 to the first electrode 303. The magnitude of an electric field to be applied is equal to or greater than the magnitude of coercive field (about 4 kV/mm) of SLN 300. An electric field generator 305 for example may be used for application of an electric field. The electric field generator 305 comprises a function generator (not illustrated) and a voltage amplifier (not illustrated). The electric field generator 305 generates an electric field corresponding to an optional pulse waveform generated by the function generator and applies the generated electric field to SLN 300. The electric field generator 305 is not limited to the above-mentioned configuration.

In step S3400, when an electric field is applied to SLN 300, a minute domain inverted in polarization is generated at an end of the second electrode 304. The generated domain grows in the direction of application of the electric field (that is, the direction from the second electrode 304 to first electrode 303). The growth speed of the domain growing toward the first electrode 303 is made low or zero after the domain has reached the control layer 302.

The reason is that a fact that the defect density $D_{cont1}$ of the control layer 302 is larger in comparison with the defect density $D_{ferro}$ of SLN 300 functions so as to suppress the growth of domain (that is, reduce the growth speed of domain) or stop the growth of domain (that is, make the growth speed of domain zero). Due to this, compensation of the electrostatic charges possessed by the domain (termination of spontaneous polarization) is suppressed and the growth of domain (side wind) in a direction perpendicular to the direction of application of electric field is also suppressed.

Thus, in case of making a control layer 302 by metal diffusion, since an expensive apparatus and a complicated apparatus are not needed, the control layer 302 can be made in very low cost.

In step S3100, a metal layer of Pt or the like may be formed as a protective film of the second face and may be removed by etching after annealing so that the second face side of SLN 300 is not influenced by annealing. Or the second electrode 304 may be used as a protective film of the second face by performing step S3300 before step S3100. And after step S3400, if needed, the control layer 302, the first electrode 303 and the second electrode 304 may be removed by etching or chemical mechanical polishing (CMP).

(2) Out-Diffusion

Figure 4:
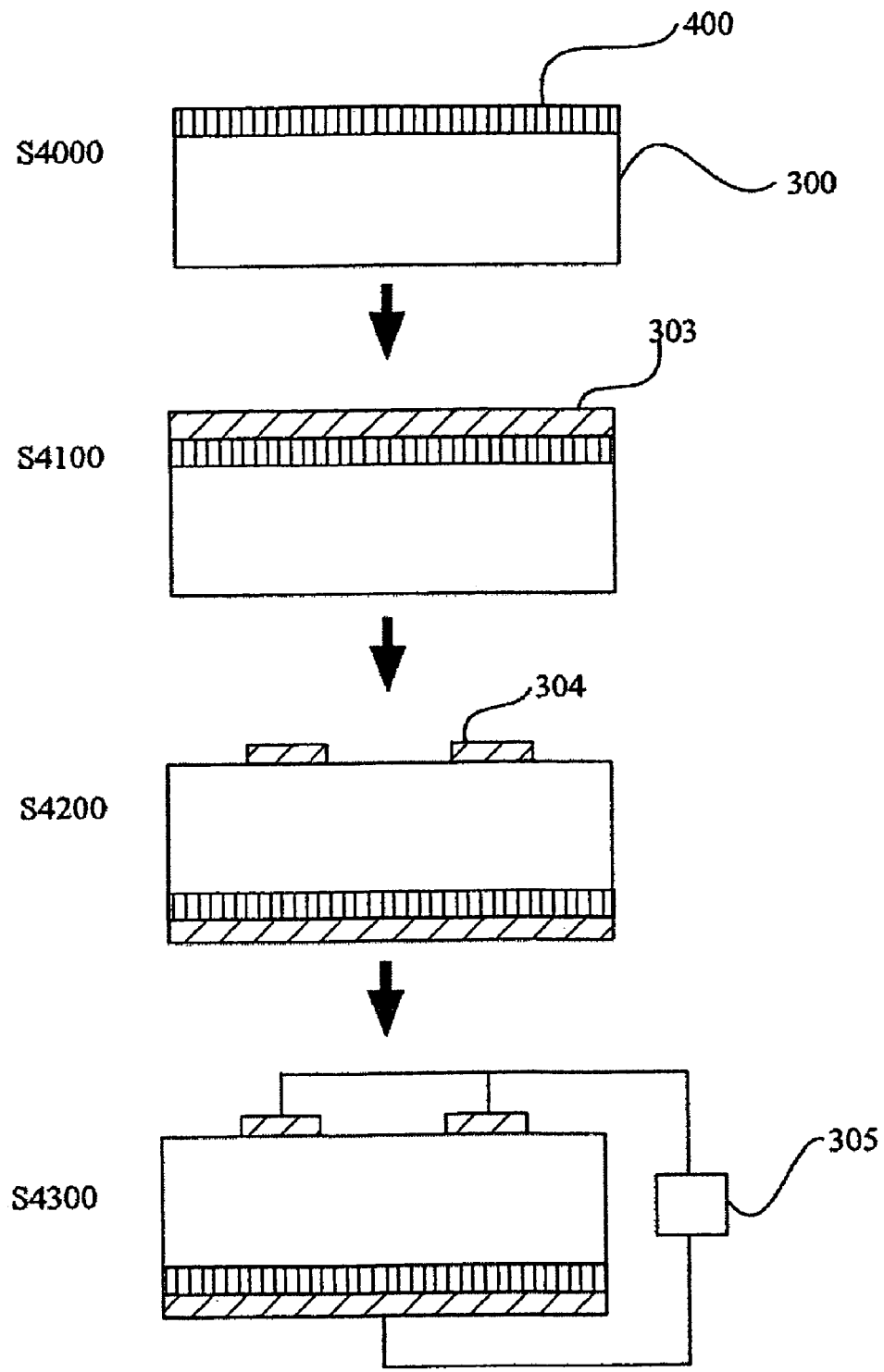
FIG. 4 is a diagram showing further steps of controlling domain inversion according to embodiment 1 by means of the first means of the present invention.

FIG. 4 is a diagram showing steps of controlling further domain inversion according to embodiment 1 of the present invention. Each step is described.

However, since steps S4100 to S4300 are the same as steps S3200 to S3400 described with reference to FIG. 3, description of them is omitted.

Step S4000: This step anneals SLN 300 to form a control layer 400. The annealing is performed within a temperature range of about 800 to 1100° C. for about 1 to 20 hours in an atmosphere selected from a group consisting of a reducing atmosphere, an oxygen atmosphere and a vacuum atmosphere. The distance of out-diffusion is about 1 to 20 μm.

By this annealing, Li atoms in the surface layer of SLN 300 are diffused out the crystal. As a result, defects (vacancies in this case) are generated in the surface layer of SLN 300.

This surface layer of SLN 300 is a control layer (out-diffused layer) 400. In a similar manner to the case of metal diffusion described in section (1), the evaluation of the defect density of the control layer 400 by out-diffusion can be performed by the Rutherford backscattering spectrometry (RBS) for example.

In case of performing an out-diffusion under the above-mentioned condition, it has been confirmed that the defect density $D_{cont1}$ of the control layer 400 and the defect density $D_{ferro}$ of SLN 300 satisfy the relation of "$D_{ferro}<D_{cont1}$".

Step S4100: This step forms a first electrode 303 on the control layer 400.

Step S4200: This step forms a second electrode 304 on a second face being opposite to a first face of SLN 300.

Step S4300: This step applies an electric field in the direction from the second electrode 304 to the first electrode 303. In case of performing an out-diffusion, it has been confirmed that about 7 seconds is required until the spontaneous polarization of domain is terminated and a side wind is generated.

In case of out-diffusion also, in a similar manner to the control layer 302, the control layer 400 suppresses compensation of electrostatic charges (termination of spontaneous polarization) of domain and suppresses the occurrence of a side wind. The case of out-diffusion has an advantage that its operation is simpler and easier in comparison with the case of metal diffusion, since the out-diffusion needs only annealing.

In step S4000, an oxide layer of $SiO_2$ or the like may be formed as a protective film of the second face and may be removed by etching after annealing so that no out-diffusion is generated also at the second face side of SLN 300 by annealing. Or the second electrode 304 may be used as a protective film of the second face by performing step S4200 before step S4000.

And after step S4300, if needed, the control layer 400, the first electrode 303 and the second electrode 304 may be removed by etching or chemical mechanical polishing (CMP).

As described above, according to embodiment 1, a control layer 302 or 400 is provided between a ferroelectric single crystal 300 and a first electrode 303.

The defect density $D_{cont1}$ of the control layers 302 and 400 and the defect density $D_{ferro}$ of the ferroelectric single crystal 300 satisfy the relation of "$D_{ferro}<D_{cont1}$". The growth speed of domain growing from the second electrode 304 toward the first electrode 303 is made low or zero by defects existing in the control layers 302 and 400.

As a result, since the termination of spontaneous polarization of domain is suppressed, the growth of domain in a direction perpendicular to the direction of application of electric field is also suppressed.

Even in case of forming domain inverted regions of short period, it is necessary to apply a voltage to SLN 300 for a longer time than in the conventional art. Therefore, it is possible to make domain inverted regions more short-period using a conventional apparatus without using an expensive apparatus.

And since the growth of domain is controlled at the first electrode 303 side, the periodicity of domain inverted regions at the first electrode 303 side is not disordered. In other words, a method of the present invention can be applied regardless of the thickness of a ferroelectric single crystal 300.

Particularly, in case of using SLN or SLT being low in coercive field as a ferroelectric single crystal 300, since a domain inverted structure being thick is obtained, it is possible to manufacture an optical wavelength conversion element for high-power output.

Embodiment 2

(1) Metal Diffusion

Figure 5:
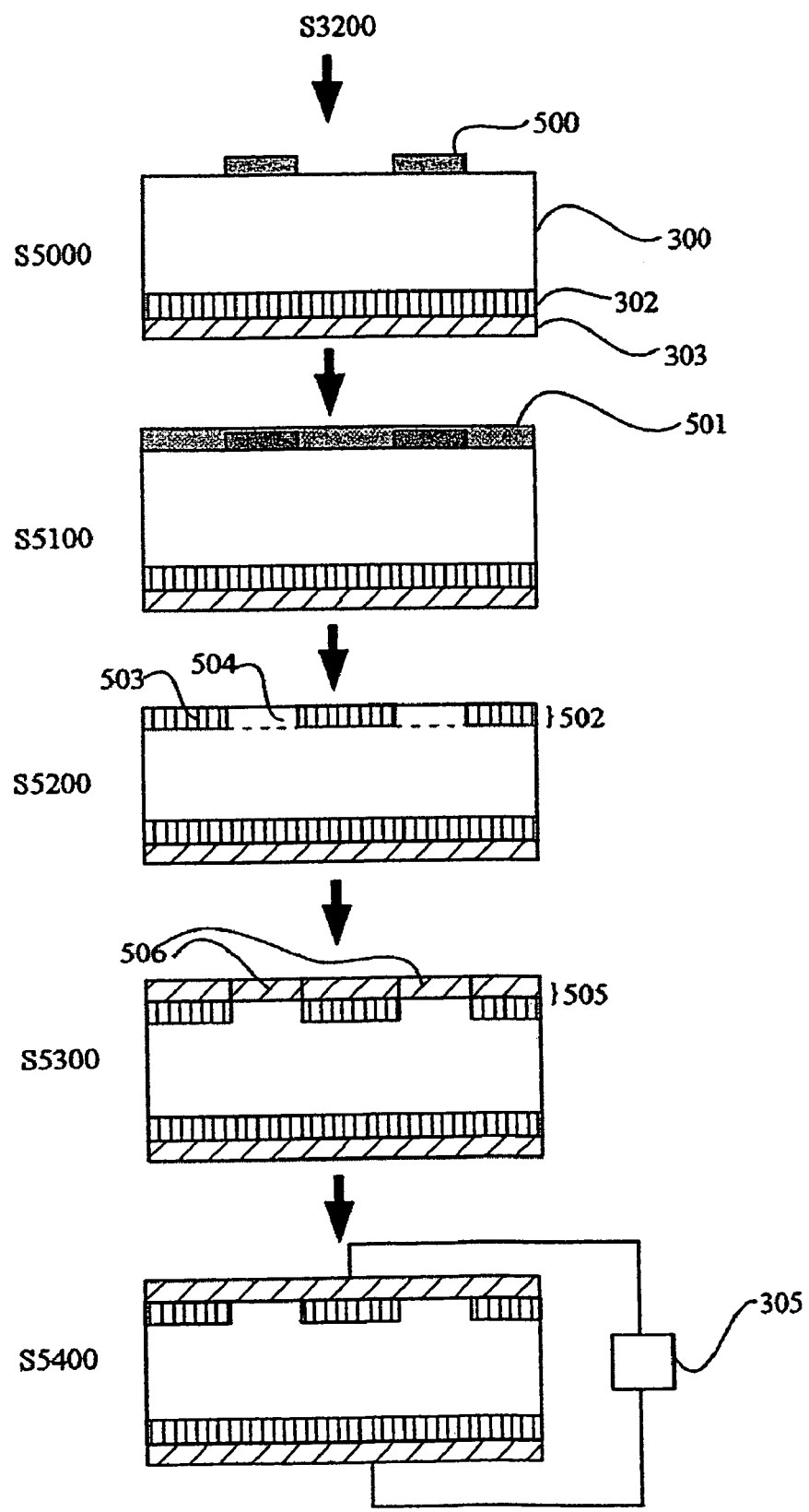
FIG. 5 is a diagram-showing-steps of controlling domain inversion according to embodiment 2 by means of the first means of the present invention.

FIG. 5 is a diagram showing steps of controlling domain inversion according to embodiment 2 of the present invention. FIG. 5 starts at step S3200 of FIG. 3, for example.

Step S5000: This step provides photoresist as a mask 500 on a second face being opposite to a first face. Next, this step patterns the photoresist into a specified shape, for example, a periodic pattern by means of a photolithography technique. The shape into which the photoresist is patterned is optional and is not limited to a periodic pattern.

Step S5100: This step forms a metal layer 501 on the mask 500 and the second face. The metal layer 501 may be made by a conventional physical vapor deposition or chemical vapor deposition method. A material for the metal layer 501 can use any metal so long as it substitutes for a Li site of SLN 300 and is different in valence from Li. A material for the metal layer 501 is preferably selected from a group consisting of Nb, Ta, Ti, Si, Mn, Y, W and Mo. The thickness of the metal layer 501 is within a range of about 100 to 1100 nm.

Step S5200: This step anneals SLN 300 having the metal layer 501 and then removes the mask 500 to form a further control layer 502. The annealing is performed within a temperature range of about 300 to 1000° C. for about 2 to 40 hours in an atmosphere selected from a group consisting of a reducing atmosphere, an oxygen atmosphere and a vacuum atmosphere. A metal atom in the metal layer 501 is substituted for a Li atom in region 503 of SLN 300 by this annealing. The distance of diffusion of metal atoms is about 500 to 20000 nm. A diffused metal atom generates a defect (substitutional impurity in this case) in the surface layer of region 503 (a first region) of SLN 300.

In such a manner, a further control layer 502 is formed. The further control layer 502 comprises the region 503 (first region) in which metal atoms are diffused and a region 504 (second region) in which metal atoms are not diffused.

These region 503 and region 504 may be alternately and periodically arranged. The evaluation of defect density of the region 503 may be performed by the Rutherford backscattering spectrometry (RBS) for example. In case of performing a metal diffusion under the above-mentioned condition, it has been confirmed that the defect density $D_{cont2}$ of the region 503 and the defect density $D_{ferro}$ of the region 504 satisfy the relation of "$D_{ferro} < D_{cont2}$". Note that the defect density of the region 504 is equal to the defect density $D_{ferro}$ of SLN 300. The mask 500 is removed by etching. An excessive metal layer 501 may be removed together with the mask 500 by etching after annealing.

Step S5300: This step forms a second electrode 505 on the further control layer 502. The second electrode 505 may be a flat electrode. The second electrode 505 may be a metal layer formed by a physical vapor deposition method or a chemical vapor deposition method.

In this case a material for the second electrode 505 is Cr for example but is not limited to this material. The thickness of the second electrode 505 is about 50 to 500 nm. The second electrode 505 may be a liquid electrode of a LiCl solution (not illustrated).

Differently from embodiment 1, it is not necessary to pattern the second electrode 505 into a periodic shape. The reason is that the second electrode 505 functions as a periodic-pattern electrode (that is, region 506) in cooperation with the region 503 (region having ions implanted in it) in the further control layer 502.

Step S5400: This step applies an electric field in the direction from the second electrode 505 to the first electrode 303 by means of an electric field generator 305. Since step S5400 is the same as step S3400 described with reference to FIG. 3 in embodiment 1, description of it is omitted.

However, since the second electrode 505 is a full-surface electrode and needs no wiring for individually applying an electric field differently from the second electrode being in a periodic shape shown in FIG. 3, it is simple and convenient.

In step S5400, when an electric field is applied to SLN 300, a minute domain inverted in polarization is generated at an end of region 506 out of the second electrode 505. The generated domain grows in the direction of application of the electric field (that is, the direction from the second electrode 505 to the first electrode 303). The growth speed of the domain growing toward the first electrode 303 is made low or zero after the domain has reached the control layer 302.

The reason is that a fact-that the defect density $D_{cont1}$ of the control layer 302 is larger in comparison with the defect density $D_{ferro}$ of SLN 300 functions so as to suppress the growth of domain (that is, reduce the growth speed of domain) or stop the growth of domain (that is, make the growth speed of domain zero).

Due to this, compensation of the electrostatic charges possessed by domain (termination of spontaneous polarization of domain) is suppressed and the growth of domain in a direction perpendicular to the direction of application of electric field (a side wind) is also suppressed.

Differently from embodiment 1, in embodiment 2, the further control layer 502 is formed at the second face side of SLN 300.

Due to this, it is possible to suppress a side wind in the direction of arrow A (FIG. 2) described with reference to FIG. 2. The reason is that the defect density $D_{cont2}$ of region 503 of the further control layer 502 is larger than the defect density $D_{ferro}$ of SLN 300 except region 503. The growth of domain to region 503 of the further control layer 502 is physically suppressed by the existence of defects in region 503.

As a result, since a periodically poled structure having domain inverted regions having the same sectional area as the area of region 506 of the second electrode 505 is obtained, it is possible to manufacture a periodically poled structure more accurately controlled.

A function of the further control layer 502 is to physically stop the growth of domain (side wind) by means of the existence of defects. Therefore, the larger the defect density of the further control layer 502 is, the more desirable it is.

Although the above description has been started at step S3200 of FIG. 3, metal diffusion may be performed using the second electrode 304 (FIG. 3) as the mask 500 after step S3300 of FIG. 3.

In this case, since it is not necessary to remove the second electrode 304 by etching or the like, the operation is simple and convenient. In this case, however, a material for the second electrode 304 must be an element being not diffused in SLN 300 by annealing.

After step S5400, if needed, the control layer 302, the first electrode 303, the further control layer 502 and the second electrode 505 may be removed by etching or chemical mechanical polishing (CMP).

(2) Out-Diffusion

Figure 6:
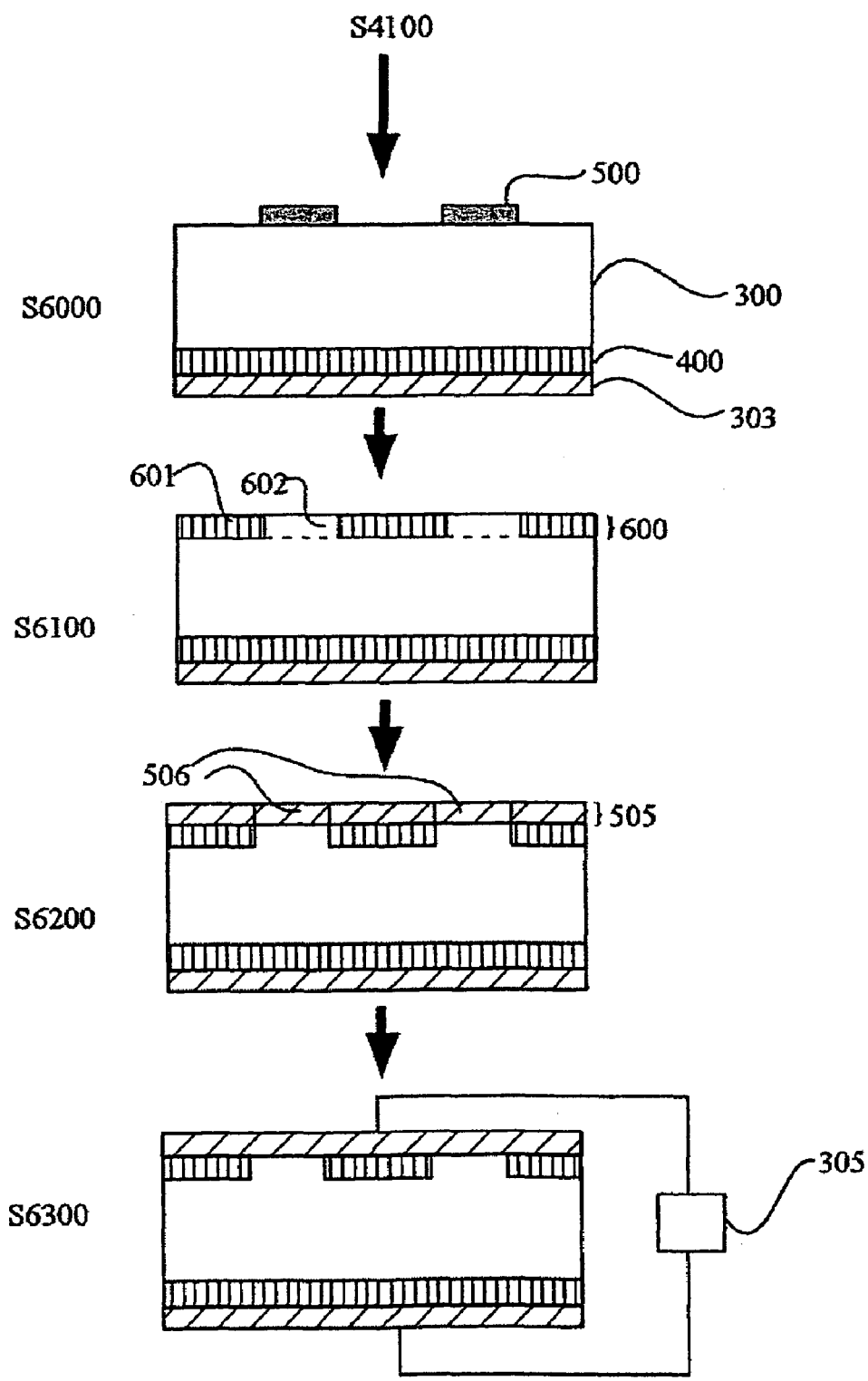
FIG. 6 is a diagram showing further steps of controlling domain inversion according to embodiment 2 by means of the first means of the present invention.

FIG. 6 is a diagram showing steps of controlling further domain inversion according to embodiment 2 of the present invention. Each step is described. Since step S6000, step S6200 and step S6300 in FIG. 6 are the same as step S5000, step S5300 and step S5400 in FIG. 5, description of them is omitted. FIG. 6 starts at step S4100 in FIG. 4, for example.

Step S6000: This step provides photoresist as a mask 500 to a second face being opposite to a first face.

Step S6100: This step anneals the second face through the mask 500 and then removes the mask 500 to form a further control layer 600.

The annealing is performed within a temperature range of about 800 to 1100° C. for about 1 to 20 hours in an atmosphere selected from a group consisting of a reducing atmosphere, an oxygen atmosphere and a vacuum atmosphere.

Li atoms in a region 601 (first region) of SLN 300 are diffused out a crystal by this annealing. The distance of out-diffusion is about 1 to 20 μm. As a result, defects (vacancies in this case) are formed in the region 601 of SLN 300.

In such a manner, a further control layer 600 is formed.

The further control layer 600 comprises a region 601 (first region) in which Li atoms are out-diffused and a region 602 in which no Li atoms are out-diffused. These region 601 and region 602 may be alternately and periodically arranged.

In a similar manner to the case of metal diffusion, the evaluation of the defect density of the region 601 by out-diffusion can be performed by the Rutherford backscattering spectrometry (RBS) for example. In case of performing an out-diffusion under the above-mentioned condition, it has been confirmed that the defect density $D_{cont2}$ of the region 601 and the defect density $D_{ferro}$ of the region 602 satisfy the relation of "$D_{ferro} < D_{cont2}$".

Note that the defect density of the region 602 is equal to the defect density $D_{ferro}$ of SLN 300. The mask 500 is removed by etching.

Step S6200: This step forms a second electrode 505 on the further control layer 600.

Step S6300: This step applies an electric field in the direction from the second electrode 505 to the first electrode 303 by means of an electric field generator 305.

In a similar manner to the further control layer 502 (FIG. 5), since the further control layer 600 formed by out-diffusion also functions so as to suppress the growth of domain (side wind) in the direction of arrow A (FIG. 2), it is possible to manufacture a periodically poled structure controlled more accurately.

Although the above description has been started at step S4100 of FIG. 4, the out-diffusion may be performed using the second electrode 304 (FIG. 4) as a mask after step S4200 of FIG. 4.

In this case, since it is not necessary to remove the second electrode 304 by etching or the like, the operation is simple and convenient. In this case, however, a material for the second electrode 304 must be an element being not diffused in SLN 300 by annealing.

After step S6300, if needed, the control layer 400, the first electrode 303, the further control layer 600 and the second electrode 505 may be removed by etching or chemical mechanical polishing (CMP).

As described above, according to embodiment 2, a further control layer 502 or 600 is provided between a ferroelectric single crystal 300 and a second electrode 505.

The further control layers 502 and 600, respectively, have first regions 503 and 601 in which metal is diffused or Li is out-diffused, and second regions 504 and 602 in which metal is not diffused or Li is not out-diffused (that is, which are the same as the ferroelectric single crystal 300).

The defect density $D_{cont2}$ of the first regions 503 and 601 and the defect density $D_{ferro}$ of the second region 504 and 602 satisfy the relation of "$D_{ferro} < D_{cont2}$". Due to this, the growth of domain to the first regions 503 and 601 is physically suppressed by defects (substitutional impurities or vacancies) existing inside.

Since the growth of domain is controlled not only at the first electrode 303 side but also at the second electrode 505 side, it is possible to manufacture a domain inverted structure controlled more accurately in comparison with embodiment 1.

Embodiment 2 has shown examples in which the further control layers 502, 600 and the control layers 302, 400 are combined by the same manufacturing method.

However, the present invention is not limited to this. For example, it is enough also to manufacture a control layer by means of metal diffusion and manufacture a further control layer by means of out-diffusion. Or it is enough also to manufacture a control layer by means of out-diffusion and manufacture a further control layer by means of metal diffusion. The combination of a method of manufacturing a control layer and a method of manufacturing a further control layer is optional.

Embodiment 3

Figure 7:
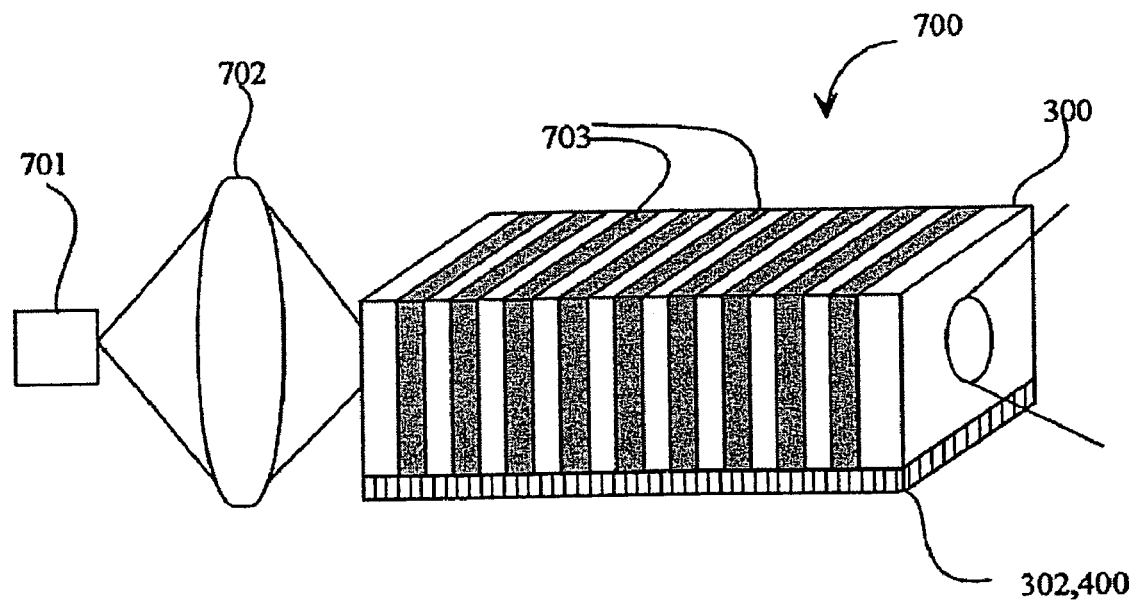
FIG. 7 is a diagram showing an optical wavelength conversion system using an optical wavelength conversion element according to embodiment 3 by means of the first means of the present invention.

FIG. 7 is a diagram showing an optical wavelength conversion system using an optical wavelength conversion element 700 according to embodiment 3 of the present invention.

The optical wavelength conversion system comprises an optical wavelength conversion element 700, a light source 701 and a beam-condensing optical system 702. The optical wavelength conversion element 700 may be manufactured by means of a method described in embodiment 1 or 2.

The optical wavelength conversion element 700 may be manufactured from substantially stoichiometric lithium niobate (SLN) 300 for example. The optical wavelength conversion element 700 may be manufactured from an optional ferroelectric single crystal having a 180-degree single domain.

SLN 300 has periodic domain inverted regions 703. The period of the domain inverted regions is within a range of about 1 to 3 μm. SLN 300 has a control layer 302 or 400.

The light source 701 may be a semiconductor laser for example but is not limited to this. The light source 701 can use an optional light source so long as its light is coherent. The light source 701 emits light of 780 nm in wavelength for example.

The beam-condensing optical system 702 may be an optional optical system functioning so as to collect and input light emitted by the light source 701 into the optical wavelength conversion element 700.

The operation of such an optical wavelength conversion system is described. Light emitted by the light source 701 is inputted into the optical wavelength conversion element 700 through the beam-condensing optical system 702. This light is called a fundamental wave.

A domain inverted region 703 is periodically repeated in the propagating direction of the light (fundamental wave) of the light source 701. The fundamental wave and its second harmonic are matched in phase with each other by such periodic domain inverted regions 703 (quasi-phase-matched).

In such a way, the fundamental wave is converted to the second harmonic of 390 nm in wavelength during propagating through the optical wavelength conversion element 700. It is enough also to make the optical wavelength conversion element 700 function as a resonator by providing a reflection coating on each of the input face and the output face for the fundamental wave of the optical wavelength conversion element 700.

Next, an embodiment of the invention according to the second means of the present invention is shown.

Embodiment 4

Figure 8:
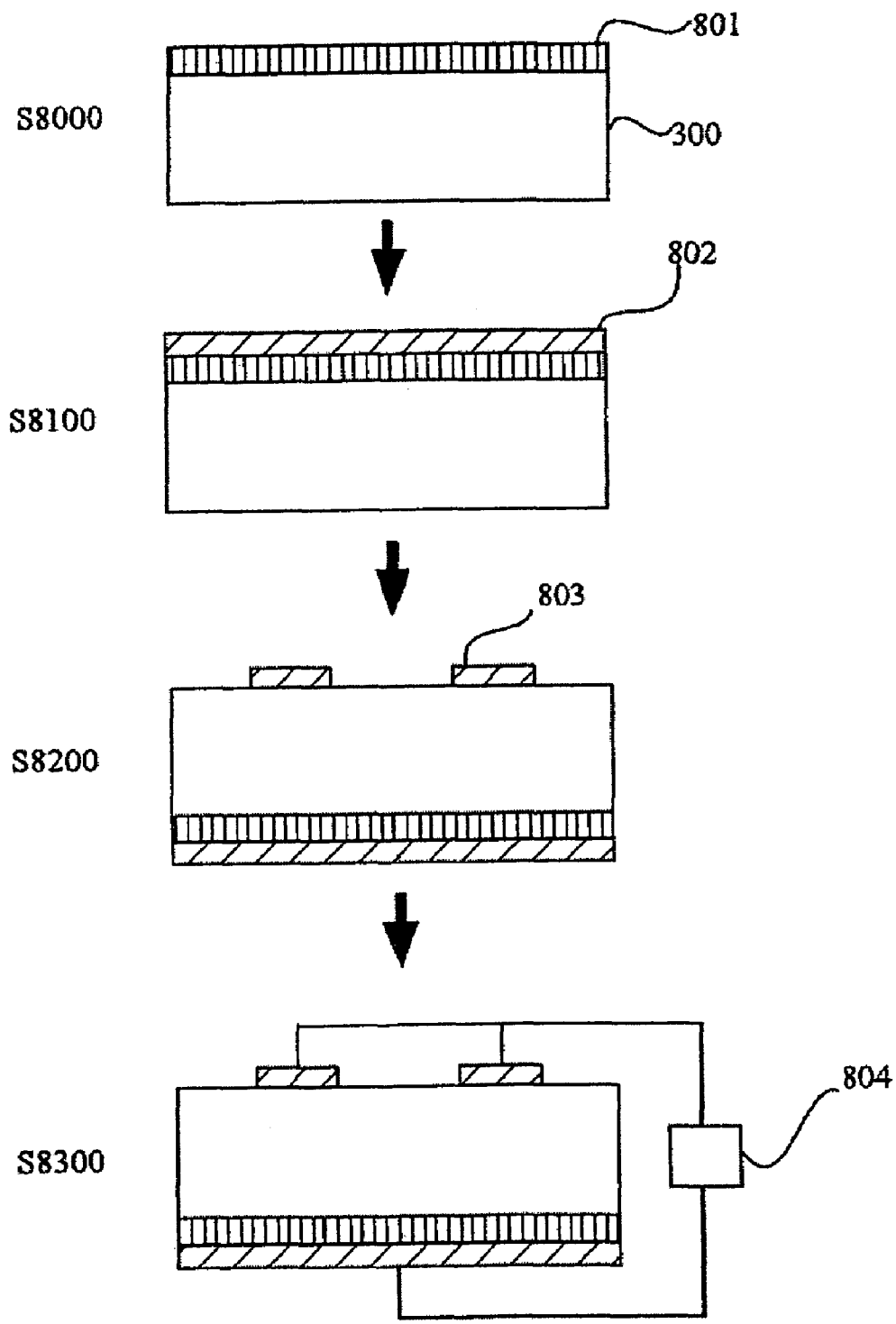
FIG. 8 is a diagram showing steps of forming a domain inverted region according to embodiment 4 by means of the second means of the present invention.

FIG. 8 is a diagram showing steps of forming a domain inverted region according to embodiment 4 of the present invention. Each step is described.

Step S8000: This step implants ions into a first face of SLN 300 to form a control layer 801. The direction of polarization of SLN 300 is parallel with the z-axis and it has a 180-degree domain. The thickness of SLN 300 is 3 mm, but is not limited to this thickness. Here, the first face is a face perpendicular to the direction of polarization and is the plus Z face.

An ion to be implanted into SLN 300 may be a rare gas ion or a metal ion and more preferably He, Ne, Ar, Zn, Nb or Mn. A charged particle applying special experiment apparatus for example may be used for implanting ions.

The implantation energy is about 100 KeV to 2 MeV, the quantity of implanted ions is within a range of about $1\times10^{10}$ to $8\times10^{16}$ cm$^{-2}$ and the depth of implantation is within a range of about 0.1 to 5 μm. Note that the above-mentioned condition of ion implantation is nothing but an example and may be varied according to the degree of order of lattice points of the control layer 801.

The implanted ions generate defects (vacancies, self-interstitial atoms or interstitial impurities in this case) in the surface layer of SLN 300. The generated defects are accumulated in the surface layer of SLN 300 and finally may make the surface layer of SLN 300 amorphous. Due to this, the control layer (ion implanted layer) 801 is formed.

The evaluation of the degree-of order of lattice points of SLN 300 and the control layer 801 may be performed by X-ray diffraction (XRD), for example.

In case that the degree of order of lattice points of the control layer 801 is lower than that of SLN 300, the full width at half maximum of a peak of X-ray diffraction becomes larger. In case that the control layer 801 is completely amorphous, no peak occurs.

In case of performing the ion implantation under the above-mentioned condition, no peak has occurred in the X-ray diffraction of the control layer 801. It has been confirmed that the control layer 801 is amorphous and is apparently lower in degree of order of lattice points in comparison with SLN 300.

However, the relation between SLN 300 and the control layer 801 does not call it into question whether the control layer 801 is crystalline or amorphous so long as the degree of order of lattice points of the control layer 801 is lower in comparison with the degree of order of lattice points of SLN 300.

Ordinarily, the ion implantation is not performed at the top surface but performed at a specified distance from the top surface. Due to this, the crystal structure of SLN 300 is not influenced at the top surface. However, note that in the drawing the control layer 801 is depicted as including the top surface for simplification of the description.

Step S8100: This step forms a first electrode 802 on the control layer 801.

The first electrode 802 may be a flat electrode. The first electrode 802 may be a metal layer formed by a physical vapor deposition method or a chemical vapor deposition method. In this case, a material for the first electrode 802 is Ta for example but is not limited to this material. The thickness of the first electrode 802 is about 50 to 500 nm. The first electrode 802 may be a liquid electrode of a LiCl solution (not illustrated).

Step S8200: This step forms a second electrode 803 on a second face being opposite to the first face of SLN 300.

The second electrode 803 may be a periodic electrode such as a comb-shaped electrode or the like. The period of the second electrode 803 is about 1 to 3 μm. The second electrode 803 may be a metal layer formed by a physical vapor deposition method or a chemical vapor deposition method. In this case, a material for the second electrode 803 is Cr for example, but is not limited to this material. The thickness of the second electrode 803 is about 50 to 500 nm. The second electrode 803 may be a liquid electrode of a LiCl solution (not illustrated).

Dry etching may be used for making the second electrode 803. In case that the second electrode 803 is a metal layer, Cr is applied to the second face of SLN 300 using a physical vapor deposition method or a chemical vapor deposition method.

Next, photoresist is applied as a mask. The photoresist is patterned into a specified shape, for example, a periodic pattern by a photolithography technology. The shape into which the photoresist is patterned is optional and is not limited to a periodic pattern. Next, the second face of SLN 300 is etched by means of a reactive ion etching (RIE) technique. After this, the photoresist is removed. By this, a metal layer having a periodic pattern is obtained as the second electrode 803.

In case that the second electrode 803 is a liquid electrode (not illustrated), the photoresist is patterned into a specified shape without forming a metal layer. After this, the liquid electrode is applied to the patterned photoresist and SLN 300 as the second electrode 803.

Step S8300: This step applies an electric field between the first electrode 802 and the second electrode 803. The magnitude of an electric field to be applied is equal to or greater than the magnitude of coercive field (about 4 kV/mm) of SLN 300. An electric field generator 804 for example is used for application of an electric field. The electric field generator 804 comprises a function generator (not illustrated) and a voltage amplifier (not illustrated). The electric field generator 804 generates an electric field corresponding to an optional pulse waveform generated by the function generator and applies the generated electric field to SLN 300. The electric field generator 804 is not limited to the above-mentioned configuration.

In step S8300, when an electric field is applied to SLN 300, a minute domain which has been polarization-inverted is generated at an end of the second electrode 803. The generated domain grows in the direction of application of the electric field (that is, the direction from the second electrode 803 to the first electrode 802). The growth speed of the domain growing toward the first electrode 802 is made low or zero after the domain has reached the control layer 801. The reason is that a fact that the degree of order of lattice points of the control layer 801 is lower in comparison with that of SLN 300 functions so as to suppress the growth of domain (that is, reduce the growth speed of domain) or stop the growth of domain (that is, make the growth speed of domain zero).

Due to this, compensation of the electrostatic charges possessed by domain (termination of spontaneous polarization of domain) is suppressed and the growth of domain (side wind) in a direction perpendicular to the direction of application of electric field is also suppressed.

In case of performing an ion implantation, it has been confirmed that the time of about 12 seconds is needed until the spontaneous polarization of domain is terminated and a side wind occurs. Therefore, it is possible to obtain domain inverted regions of short period by only controlling the time period of applying an electric field to SLN 300 by means of an electric field generator 804 according to the degree of order of lattice points of the control layer 801.

After step S8300, if needed, the control layer 801, the first electrode 802 and the second electrode 803 may be removed by etching or chemical mechanical polishing (CMP).

As described above, according to embodiment 4, the control layer 801 is provided between the ferroelectric single crystal 300 and the first electrode 802 where the spontaneous polarization of domain is terminated, and the relation between the control layer 801 and the ferroelectric single crystal 300 satisfies the condition that the degree of order of lattice points of the control layer 801 is lower in comparison with the degree of order of lattice points of the ferroelectric single crystal 300.

Due to this, the growth speed of domain growing from the second electrode 803 toward the first electrode 802 is made low or zero by the disorder of lattice points of the control layer 801. As a result, since the termination of spontaneous polarization of domain is suppressed, the growth of domain in a direction perpendicular to the direction of application of electric field is also suppressed.

Even in case of forming domain inverted regions of short period, it is necessary to apply a voltage to SLN 300 for a longer time than in the conventional art. Therefore, it is possible to make domain inverted regions more short-period using a conventional apparatus without using an expensive apparatus. And since the growth of domain is controlled at the first electrode 802 side, the periodicity of domain inverted regions at the first electrode 802 side is not disordered.

In other words, a method of the present invention can be applied regardless of the thickness of a ferroelectric single crystal 300. Particularly, in case of using SLN or SLT being low in coercive field as a ferroelectric single crystal 300, since domain inverted regions being thick are obtained, it is possible to manufacture an optical wavelength conversion element for high-power output.

Embodiment 5

Figure 9:
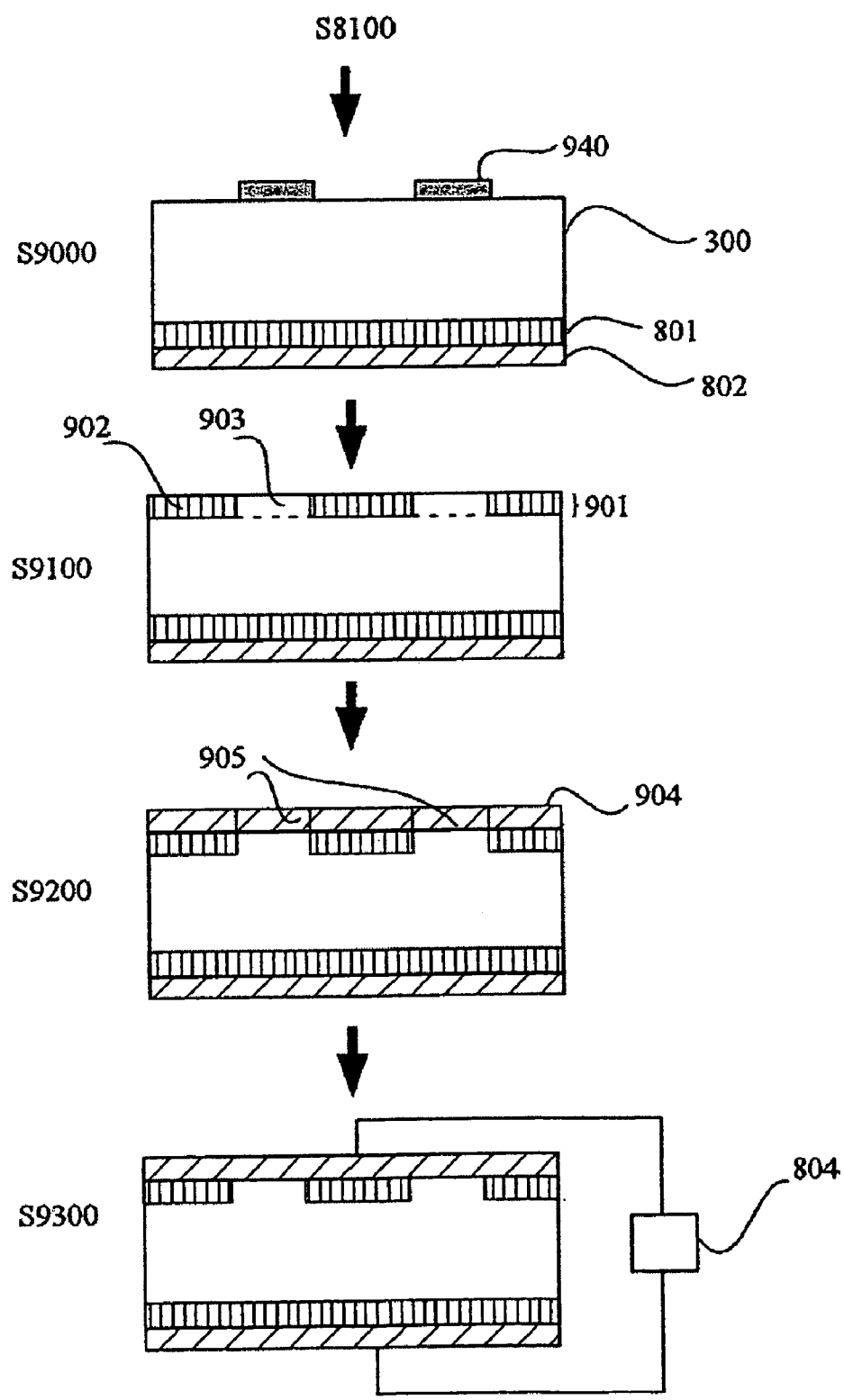
FIG. 9 is a diagram showing steps of forming a domain inverted region according to embodiment 5 by means of the second means of the present invention.

FIG. 9 is a diagram showing steps of forming a domain inverted region according to embodiment 5 of the present invention. Each step is described. FIG. 9 starts at step S8100 of FIG. 8 for example.

Step S9000: This step provides photoresist as a mask 940 on a second face being opposite to a first face. Next, this step patterns the photoresist into a specified shape, for example, a periodic pattern by means of a photolithography technique. The shape into which the photoresist is patterned is optional and is not limited to a periodic pattern.

Step S9100: This step implants ions into the second face of SLN 300 through the mask 940 and then removes the mask 940 to form a further control layer 901. An ion to be implanted into SLN 300 may be a rare gas ion or a metal ion and more preferably He, Ne, Ar, Zn, Nb or Mn. A charged particle applying special experiment apparatus for example may be used for implanting ions. The implantation energy is about 100 KeV to 2 MeV, the quantity of implanted ions is within a range of about $1 \times 10^{10}$ to $8 \times 10^{16}$ cm$^{-2}$ and the depth of implantation is within a range of about 0.1 to 5 µm. Note that the above-mentioned condition of ion implantation is nothing but an example and may be varied according to the degree of order of lattice points of the further control layer 901.

The implanted ions generate defects (vacancies, self-interstitial atoms or interstitial impurities in this case) in region 902 of the surface layer of SLN 300.

The generated defects are accumulated in the region 902 and finally may make the region 902 (first region) of SLN 300 amorphous.

The condition of ion implantation may be varied according to the degree of order of lattice points of the region 902. The mask 904 is removed by etching. Thus the further control layer 901 is formed.

The further control layer 901 comprises a region 902 (first region) in which ions are implanted and a region 903 (second region) in which ions are not implanted. These region 902 and region 903 may be alternately and periodically arranged.

The evaluation of the degree of order of lattice points of the region 902 and region 903 may be performed by X-ray diffraction (XRD), for example. In case of performing an ion implantation under the above-mentioned condition, no peak occurred in the X-ray diffraction of the region 902, and the region 902 was amorphous. On the other hand, in the region 903 a peak of diffraction showing SLN 300 occurred. It has been confirmed that the degree of order of lattice points of the region 902 is lower in comparison with the degree of order of lattice points of the region 903. Note that the full width at half maximum of a diffraction peak of the region 903 is naturally equal to the full width at half maximum of a diffraction peak of SLN 300.

However, the relation between the region 902 and the region 903 does not call it into question whether the region 902 is crystalline or amorphous so long as the degree of order of lattice points of the region 902 is lower in comparison with the degree of order of lattice points of the region 903.

Ordinarily, the ion implantation is not performed at the top surface but performed at a specified distance from the top surface. Due to this, the crystal structure of SLN 300 is not influenced at the top surface. However, note that in the drawing the control layer 901 is depicted as including the top surface of the region 902 for simplification of the description.

Step S9200: This step forms a second electrode 904 on the further control layer 901. The second electrode 904 may be a flat electrode. The second electrode 904 may be a metal layer formed by a physical vapor deposition method or a chemical vapor deposition method. In this case, a material for the second electrode 904 is Cr for example but is not limited to this material. The second electrode 904 may be a liquid electrode of a LiCl solution (not illustrated). The thickness of the second electrode 904 is about 50 to 500 nm. Differently from embodiment 4, it is not necessary to pattern the second electrode 904 into a periodic pattern. The reason is that the second electrode 904 functions as a periodic-pattern electrode (that is, region 905) in cooperation with region 902 (region having ions implanted in it) in the further control layer 901.

Step S9300: This step applies an electric field between the first electrode 802 and the second electrode 904. Since step 9300 is the same as step S8300 described with reference to FIG. 8 in embodiment 4, description of it is omitted. However, since the second electrode 904 is a full-surface electrode and needs no wiring for individually applying an electric field differently from the periodic second upper electrode 803 described in FIG. 8, it is simple and convenient.

In step S9300, when an electric field is applied to SLN 300, a minute domain which is polarization-inverted is generated at an end of region 905 out of the second electrode 904.

The generated domain grows in the direction of application of electric field (that is, direction from the second electrode 904 to the first electrode 802).

The growth speed of domain growing toward the first electrode 802 is made low or zero after the domain has reached the control layer 801. The reason is that a fact that the degree of order of lattice points of the control layer 801 is lower in comparison with that of SLN 300 functions so as to suppress the growth of domain (that is, reduce the growth speed of domain) or stop the growth of domain (that is, make the growth speed of domain zero).

Due to this, compensation of the electrostatic charges possessed by domain (termination of spontaneous polarization of domain) is suppressed and the growth of domain in a direction perpendicular to the direction of application of electric field (side wind) is also suppressed.

Differently from embodiment 4, in embodiment 5, a further control layer 901 is formed at the second face side. Due to this, a side wind in the direction of arrow A (FIG. 2) described with reference to FIG. 2 can be suppressed.

The reason is that the degree of order of lattice points of region 902 of the further control layer 901 is lower than the degree of order of lattice points of the region 903. The growth of domain toward region 902 of the further control layer 901 is physically suppressed by the disorder of lattice points in the region 902. As a result, since a domain inverted region having the same sectional area as the area of region 905 of the second electrode 904 is obtained, it is possible to form a domain inverted region controlled more accurately.

The function of the further control layer 901 is to physically stop the growth of domain (side wind) by the disorder of lattice points inside. Therefore, the lower the degree of order of lattice points of the further control layer 901 is, the more desirable it is.

Although the above description has started at step S8100 of FIG. 8, it is enough also to perform an ion implantation using the second electrode 803 (FIG. 8) as a mask after step S8200 of FIG. 8. In this case, since it is not necessary to remove the second electrode 803 by means of etching and the like, the operation is simple and easy.

After step S9300, if needed, the control layer 801, the first electrode 802, the further control layer 901 and the second electrode 904 may be removed by etching or chemical mechanical polishing (CMP).

Embodiment 6

Figure 10:
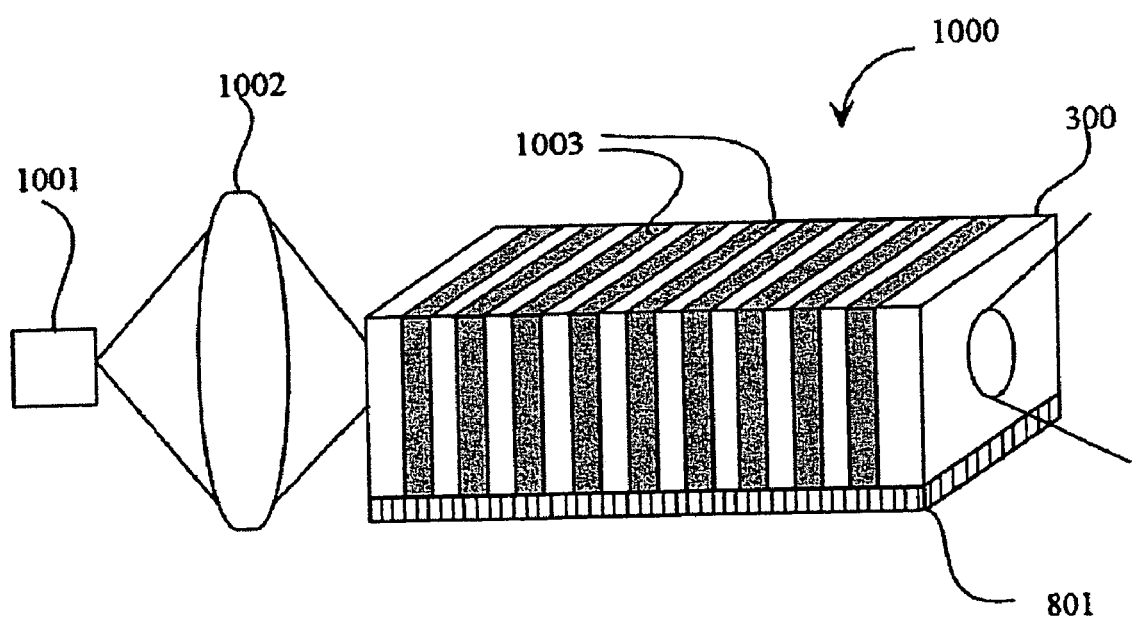
FIG. 10 is a diagram showing an optical wavelength conversion system using an optical wavelength conversion element according to embodiment 6 by means of the second means of the present invention.
Figure 11:
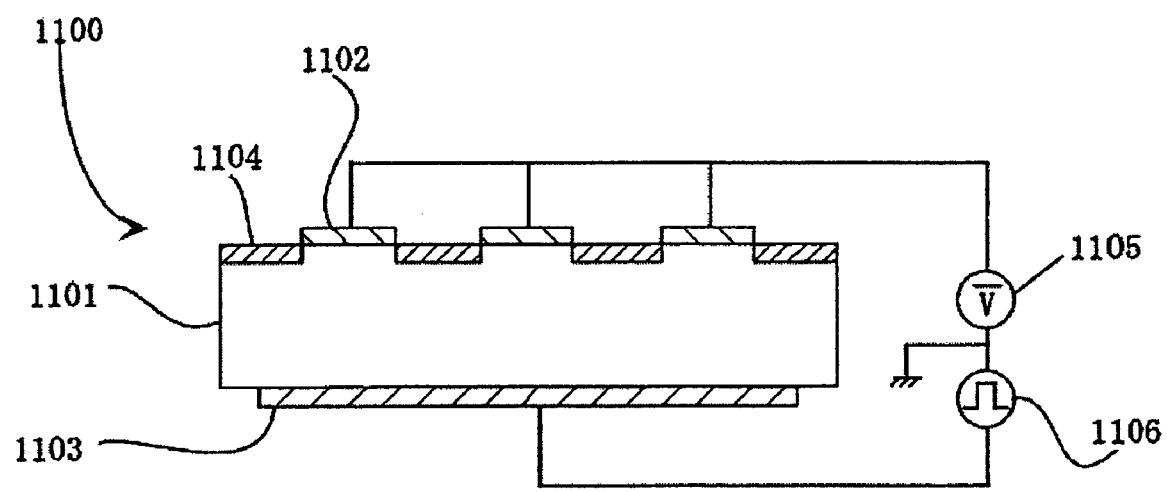
FIG. 11 is a diagram showing a method of forming periodic domain inverted regions according to the conventional art.

FIG. 10 is a diagram showing an optical wavelength conversion system using an optical wavelength conversion element 1000 according to embodiment 6 of the invention by means of the second means of the present invention.

The optical wavelength conversion system comprises an optical wavelength conversion element 1000, a light source 1001 and a beam-condensing optical system 1002.

The optical wavelength conversion element 1000 may be manufactured by means of a method described in embodiment 4 or 5.

The optical wavelength conversion element 1000 may be manufactured from substantially stoichiometric lithium niobate (SLN) 300, for example. The optical wavelength conversion element 1000 may be manufactured from an optional ferroelectric single crystal having a 180-degree domain.

SLN 300 has periodic domain inverted regions 1003. The period of domain inverted regions is within a range of about 1 to 3 μm. SLN 300 has a control layer 801.

The light source 1001 may be a semiconductor laser for example but is not limited to this. The light source 1001 can use an optional light source so long as its light is coherent. The light source 1001 emits light of 780 nm in wavelength for example.

The beam-condensing optical system 1002 may be an optional optical system functioning so as to collect and input the light emitted by the light source 1001 into the optical wavelength conversion element 1000.

The operation of such an optical wavelength conversion system is described.

The light emitted by the light source 1001 is inputted into the optical wavelength conversion element 1000 through the beam-condensing optical system 1002. This light is called a fundamental wave.

A domain inverted region 1003 is repeated periodically in the propagating direction of the light (fundamental wave) of the light source 1001. The fundamental wave and its second harmonic are matched in phase with each other by such periodic domain inverted regions 1003 (quasi-phase-matched).

In such a way, the fundamental wave is converted to the second harmonic of 390 nm in wavelength during propagating through the optical wavelength conversion element 1000. The optical wavelength conversion element 1000 may be made to function as a resonator by providing a reflection coating on each of the output face and the input face for the fundamental wave of the optical wavelength conversion element 1000.

By using the present invention in such a way, it is possible to manufacture an optical wavelength conversion element 1000 having domain inverted regions 1003 of shorter period than that of the conventional art.

As a result, the conversion to a short wavelength (conversion of light of 780 nm in wavelength to light of 390 nm, for example) becomes possible. Furthermore, a further high-efficiency conversion is made possible by using an optical wavelength-conversion element 1000 as a reflection-type optical wavelength conversion element.

And since it is possible to make an optical wavelength conversion element having minute chirps by using the present invention, it is possible to expand the wavelength bandwidth of incident light and as a result, the resistance to deviation in wavelength of light emitted by a light source 1001 is improved.

An optical wavelength conversion element 1000 as described above is nothing but an example of applying a step of the present invention. The present invention is applicable also to an electro-optic deflector, a modulator and a surface acoustic wave device, for example.

INDUSTRIAL APPLICABILITY

As described above, according to the present invention, a control layer is provided between a ferroelectric single crystal and a first electrode (electrode at the side where the spontaneous polarization of domain is terminated). The defect density $D_{cont1}$ of a control layer and $D_{ferro}$ of a ferroelectric single crystal satisfy the relation of "$D_{ferro} < D_{cont1}$", or the degree of order of lattice points of the control layer satisfies that it is lower in comparison with the degree of order of lattice points of the ferroelectric single crystal. Due to this, the growth speed of domain growing in the direction from a second electrode to a first electrode is made low or zero at the control layer. As a result, the termination of spontaneous polarization of domain is suppressed and the growth of domain in a direction perpendicular to the direction of application of electric field is suppressed.

Even in case of forming domain inverted regions of short period, it is necessary to apply a voltage to a ferroelectric single crystal for a longer time than in the conventional art. Therefore, it is possible to make domain inverted regions more short-period using a conventional apparatus without using an expensive apparatus. And since the growth of domain is controlled at the first electrode side, the periodicity of domain inverted regions at the first electrode side is not disordered. As a result, it is possible to expand the range of wavelength conversion (that is, to make short-wavelength). And it is possible to build a new template, device and the like utilizing such a high-precision control in the first electrode side. Since a method of the present invention is applicable regardless of the thickness of a ferroelectric single crystal, it is possible to manufacture a thick optical wavelength conversion element for high-power output.

The invention claimed is:

1. A method of forming a domain inverted region in a ferroelectric single crystal, said method comprising;
    a step of forming a control layer having a larger defect density $D_{cont1}$ than a defect density $D_{ferro}$ of said ferroelectric single crystal ($D_{ferro} < D_{cont1}$) in a first face perpendicular to a direction of polarization of said ferroelectric single crystal in said ferroelectric single crystal,
    a step of forming a first electrode on said first face,
    a step of forming a second electrode having a smaller area than an area of said first electrode on a second face being opposite to said first face of said ferroelectric single crystal, and
    a step of applying an electric field between said first electrode and said second electrode, in which a spontaneous polarization possessed by a domain inverted region generated from said second electrode is terminated through said control layer at said first electrode side, and
    wherein said control layer functions as physical hindrance for a growth of said domain inverted region to said first electrode by said larger defect density $D_{cont1}$.

2. A method of forming a domain inverted region in a ferroelectric single crystal according to claim 1, wherein said ferroelectric single crystal is substantially stoichiometric lithium niobate or lithium tantalite.

3. A method of forming a domain inverted region in a ferroelectric single crystal according to claim 2, wherein said substantially stoichiometric lithium niobate or lithium tantalite comprises an element of 0.1to 3.0mol%, said element being selected from the group consisting of Mg, Zn, Sc and In.

4. A method of forming a domain inverted region in a ferroelectric single crystal according to claim 1, wherein the step of forming said control layer comprises a step of annealing said first face in an atmosphere selected from the group consisting of an inert atmosphere, an oxygen atmosphere and a vacuum atmosphere to outdiffuse atoms from said first face.

5. A method of forming a domain inverted region in a ferroelectric single crystal according to claim 1, said method further comprising a step of forming a further control layer including a first region and a second region in said second face, wherein the defect density of said second region is equal to the defect density $D_{ferro}$ of said ferroelectric single crystal and the defect density $D_{cont2}$ of said first region is larger than the defect density $D_{ferro}$ of said second region ($D_{ferro} < D_{cont2}$), and
    wherein said further control layer functions as physical hindrance for the growth of said domain inverted region in a direction perpendicular to the direction of polarization by said larger defect density $D_{cont2}$ of said first region.

6. A method of forming a domain inverted region in a ferroelectric single crystal according to claim 5, wherein the step of forming said further control layer comprises;
    a step of depositing a metal layer selected from the group consisting of Nb, Ta, Ti, Si, Mn, Y, W and Mo on said second face, and
    a step of annealing said metal layer.

7. A method of forming a domain inverted region in a ferroelectric single crystal according to claim 5, wherein the step of forming said further control layer comprises a step of annealing said second face through a mask in an atmosphere selected from the group consisting of an inert atmosphere, an oxygen atmosphere and a vacuum atmosphere.

8. A method of forming a domain inverted region in a ferroelectric single crystal according to claim 1, wherein said first electrode is a flat electrode and said second electrode is a periodic electrode.

9. A method of forming a domain inverted region in a ferroelectric single crystal according to claim 1, said method further comprising a step of removing said first electrode, said second electrode and said control layer after said step of applying an electric field.

10. A method of forming a domain inverted region in a ferroelectric single crystal , said method comprising;
    a step of forming a control layer having a larger defect density $D_{cont1}$ than a defect density $D_{ferro}$ of said ferroelectric single crystal ($D_{ferro} < D_{cont1}$) in a first face perpendicular to a direction of polarization of said ferroelectric single crystal in said ferroelectric single crystal,
    a step of forming a first electrode on said first face,
    a step of forming a second electrode having a smaller area than an area of said first electrode on a second face being opposite to said first face of said ferroelectric single crystal, and
    a step of applying an electric field between said first electrode and said second electrode, in which a spontaneous polarization possessed by a domain inverted region generated from said second electrode is terminated through said control layer at said first electrode side,
    wherein the step of forming said control layer comprises;
    a step of depositing a metal layer selected from the group consisting of Nb, Ta, Ti, Si, Mn, Y, W and Mo on said first face, and
    a step of annealing said metal layer.

11. A method of forming a domain inverted region in a ferroelectric single crystal, said method comprising;
    a step of forming a control layer having a lower degree of order of lattice points than a degree of order of lattice points of said ferroelectric single crystal in a first face perpendicular to a direction of polarization of said ferroelectric single crystal in said ferroelectric single crystal,
    a step of forming a first electrode on said first face,
    a step of forming a second electrode having a smaller area than an area of said first electrode on a second face being opposite to said first face of said ferroelectric single crystal, and
    a step of applying an electric field between said first electrode and said second electrode, in which a spontaneous polarization possessed by a domain inverted region generated from said second electrode is terminated through said control layer at said first electrode side, and
    wherein said control layer functions as physical hindrance for a growth of said domain inverted region to said first electrode by said lower degree of order of lattice points.

12. A method of forming a domain inverted region in a ferroelectric single crystal according to claim 11, wherein said ferroelectric single crystal is substantially stoichiometric lithium niobate or lithium tantalite.

13. A method of forming a domain inverted region in a ferroelectric single crystal according to claim 12, wherein said substantially stoichiometric lithium niobate or lithium tantalite comprises an element of 0.1 to 3.0 mol%, said element being selected from the group consisting of Mg, Zn, Sc and In.

14. A method of forming a domain inverted region in a ferroelectric single crystal according to claim 11, wherein the step of forming said control layer comprises a step of implanting ions selected from the group consisting of rare gases, Zn, Nb and Mn into said first face.

15. A method of forming a domain inverted region in a ferroelectric single crystal according to claim 11, said method further comprising a step of forming a further control layer including a first region and a second region in said second face, wherein a degree of order of lattice points of said second region is equal to a degree of order of lattice points of said ferroelectric single crystal and a degree of order of lattice points of said first region is lower in comparison with the degree of order of lattice points of said second region, and wherein said further control layer functions as physical hindrance for a growth of said domain inverted region in a direction perpendicular to the direction of polarization by said lower degree of order of lattice points of said first region.

16. A method of forming a domain inverted region in a ferroelectric single crystal according to claim 15, wherein the step of forming said further control layer comprises a step of implanting ions selected from the group consisting of rare gases, Zn, Nb and Mn into said second face through a mask.

17. A method of forming a domain inverted region in a ferroelectric single crystal according to claim 11, wherein said first electrode is a flat electrode and said second electrode is a periodic electrode.

18. A method of forming a domain inverted region in a ferroelectric single crystal according to claim 11, said method further comprising a step of removing said first electrode, said second electrode and said control layer after said step of applying an electrode field.

\* \* \* \* \*